United States Patent
Tarmann et al.

(10) Patent No.: US 12,014,415 B2
(45) Date of Patent: *Jun. 18, 2024

(54) CONTINUOUSLY UPDATING MORTGAGE READY DATA

(71) Applicant: State Farm Mutual Automobile Insurance Company, Bloomington, IL (US)

(72) Inventors: Benjamin Tarmann, Normal, IL (US); Richard R. Rhodes, Tacoma, WA (US); Lokesh Awasthy, Santa Clara, CA (US); Denise DeRoeck, Bloomington, IL (US); Jaime Skaggs, Chenoa, IL (US); Jacob J. Alt, Downs, IL (US); Shanna L. Phillips, Bloomington, IL (US); Shyam Tummala, Bloomington, IL (US); Matthew S. Meierotto, Bloomington, IL (US); Richard D. Groonwald, Bloomington, IL (US); Brian J. Hughes, Scottsdale, AZ (US)

(73) Assignee: State Farm Mutual Automobile Insurance Company, Bloomington, IL (US)

( * ) Notice: Subject to any disclaimer, the term of this patent is extended or adjusted under 35 U.S.C. 154(b) by 231 days.

This patent is subject to a terminal disclaimer.

(21) Appl. No.: 17/383,347

(22) Filed: Jul. 22, 2021

(65) Prior Publication Data

US 2021/0350455 A1    Nov. 11, 2021

Related U.S. Application Data

(62) Division of application No. 15/975,474, filed on May 9, 2018, now Pat. No. 11,094,007.

(Continued)

(51) Int. Cl.
*G06Q 40/00* (2023.01)
*G06Q 40/02* (2023.01)
(Continued)

(52) U.S. Cl.
CPC ............. *G06Q 40/03* (2023.01); *G06Q 40/02* (2013.01); *G06Q 50/16* (2013.01); *H04L 9/0637* (2013.01); *H04L 9/50* (2022.05)

(58) Field of Classification Search
CPC ...... G06Q 40/00; G06Q 40/02; G06Q 40/025; G06Q 40/03; G06Q 50/16; H04L 9/0637; H04L 9/50
(Continued)

(56) References Cited

U.S. PATENT DOCUMENTS 3,735,360 A    5/1973    Anderson et al.
5,018,063 A    5/1991    Liu
(Continued)

FOREIGN PATENT DOCUMENTS

CA    3026039 A1    12/2017
CN    107038642 A    8/2017
WO    WO2017091530    6/2017

OTHER PUBLICATIONS

DeRidder, et al., "Blockchain: The Impact on the Real Estate Industry", PillsburyLaw Client Alert, Dec. 2016, 4 pgs.
(Continued)

*Primary Examiner* — Eric T Wong
*Assistant Examiner* — Mohammed H Mustafa
(74) *Attorney, Agent, or Firm* — Lee & Hayes, P.C.

(57) ABSTRACT

A system and computer-implemented method of continuously updating information about one or more of a customer approved for a mortgage and a real estate property identified as mortgage ready. The method includes monitoring information accessed from a memory storage location corre-
(Continued)

sponding to a customer identification number, the information used to determine the customer is approved for a mortgage, and receiving new information about the customer, the new information used to determine the customer is approved for a mortgage. The method also includes updating, at a memory coupled to the one or more processors, the memory storage location to include the new information. The method still further includes recalculating the amount in which the customer is approved for a mortgage based upon the new information received.

14 Claims, 19 Drawing Sheets

Related U.S. Application Data

(60) Provisional application No. 62/581,494, filed on Nov. 3, 2017, provisional application No. 62/535,018, filed on Jul. 20, 2017, provisional application No. 62/514,470, filed on Jun. 2, 2017, provisional application No. 62/504,328, filed on May 10, 2017.

(51) Int. Cl.
  *G06Q 40/03* (2023.01)
  *G06Q 50/16* (2012.01)
  *H04L 9/06* (2006.01)
  *H04L 9/00* (2022.01)

(58) Field of Classification Search
  USPC .................................................. 705/4, 35–45
  See application file for complete search history.

(56) References Cited

U.S. PATENT DOCUMENTS

| | | | |
|---|---|---|---|
| 5,689,650 | A | 11/1997 | McClelland et al. |
| 6,463,509 | B1 | 10/2002 | Teoman et al. |
| 6,904,496 | B2 | 6/2005 | Raves et al. |
| 7,051,326 | B2 | 5/2006 | Goodman |
| 7,313,683 | B2 | 12/2007 | Takahashi |
| 7,593,893 | B1 | 9/2009 | Ladd et al. |
| 7,603,533 | B1 | 10/2009 | Tsypliaev et al. |
| 7,653,592 | B1 | 1/2010 | Flaxman et al. |
| 7,725,359 | B1 | 5/2010 | Katzfey et al. |
| 8,090,936 | B2 | 1/2012 | Fallon et al. |
| 8,423,451 | B1 | 4/2013 | Flaxman et al. |
| 8,433,650 | B1 | 4/2013 | Thomas |
| 8,442,906 | B1 | 5/2013 | Thomas |
| 9,672,487 | B1 | 6/2017 | Garcia et al. |
| 10,008,102 | B1 | 6/2018 | McEachron |
| 10,467,675 | B1 | 11/2019 | Manelis et al. |
| 10,521,780 | B1 | 12/2019 | Hopkins, III et al. |
| 2001/0029482 | A1 | 10/2001 | Tealdi et al. |
| 2003/0212565 | A1 | 11/2003 | Badali et al. |
| 2003/0212628 | A1 | 11/2003 | Kuttan et al. |
| 2004/0044730 | A1 | 3/2004 | Gockel et al. |
| 2005/0119908 | A1 | 6/2005 | Hippe et al. |
| 2006/0020541 | A1 | 1/2006 | Gommlich |
| 2006/0031159 | A1 | 2/2006 | Minot et al. |
| 2006/0155639 | A1 | 7/2006 | Lynch et al. |
| 2006/0235712 | A1 | 10/2006 | Rodriguez |
| 2006/0282356 | A1* | 12/2006 | Andres .................. G06Q 40/04 |
| | | | 705/37 |
| 2007/0244798 | A1 | 10/2007 | Weidenbenner |
| 2009/0006185 | A1 | 1/2009 | Stinson |
| 2009/0222328 | A1 | 9/2009 | Figueroa et al. |
| 2010/0042534 | A1* | 2/2010 | Moran .................. G06Q 40/03 |
| | | | 705/38 |
| 2010/0106639 | A1* | 4/2010 | Banerjee ............... G06Q 40/03 |
| | | | 705/38 |
| 2011/0106692 | A1 | 5/2011 | Moore et al. |
| 2011/0218934 | A1 | 9/2011 | Elser |
| 2012/0185375 | A1* | 7/2012 | Tealdi .................. G06Q 40/03 |
| | | | 705/37 |
| 2013/0131977 | A1 | 5/2013 | Dickson et al. |
| 2013/0262290 | A1 | 10/2013 | Hanson |
| 2014/0012720 | A1 | 1/2014 | O'Kane |
| 2014/0032262 | A1 | 1/2014 | Desmond |
| 2014/0279398 | A1 | 9/2014 | Stewart et al. |
| 2014/0289098 | A1 | 9/2014 | Walzak |
| 2014/0304028 | A1 | 10/2014 | Saxena et al. |
| 2014/0316965 | A1 | 10/2014 | Petrisor |
| 2015/0039490 | A1 | 2/2015 | Forrester et al. |
| 2015/0127488 | A1 | 5/2015 | Cutler |
| 2015/0269666 | A1* | 9/2015 | Swierczek ............ G06Q 40/02 |
| | | | 705/38 |
| 2015/0310476 | A1 | 10/2015 | Gadwa |
| 2015/0332283 | A1 | 11/2015 | Witchey |
| 2016/0027069 | A1 | 1/2016 | Treadwell et al. |
| 2016/0034996 | A1 | 2/2016 | Min |
| 2016/0035053 | A1 | 2/2016 | Gerhardt |
| 2016/0171603 | A1 | 6/2016 | Amtrup et al. |
| 2016/0330034 | A1 | 11/2016 | Back et al. |
| 2016/0371740 | A1 | 12/2016 | Heiser, II et al. |
| 2017/0046638 | A1 | 2/2017 | Chan et al. |
| 2017/0046651 | A1 | 2/2017 | Lin et al. |
| 2017/0046799 | A1 | 2/2017 | Chan et al. |
| 2017/0046806 | A1 | 2/2017 | Haldenby et al. |
| 2017/0076408 | A1* | 3/2017 | D'Souza ............... G06Q 20/10 |
| 2017/0161717 | A1 | 6/2017 | Xing et al. |
| 2017/0186116 | A1 | 6/2017 | Poll et al. |
| 2017/0206365 | A1 | 7/2017 | Garcia et al. |
| 2017/0213267 | A1 | 7/2017 | Degaugue et al. |
| 2017/0244721 | A1 | 8/2017 | Kurian et al. |
| 2018/0039667 | A1 | 2/2018 | Pierce |
| 2018/0047111 | A1 | 2/2018 | Vieira |
| 2018/0062831 | A1 | 3/2018 | Zhang |
| 2018/0082287 | A1 | 3/2018 | Sheerin |
| 2018/0115538 | A1 | 4/2018 | Blake |
| 2018/0211313 | A1 | 7/2018 | Narahari |
| 2018/0241546 | A1 | 8/2018 | Leng et al. |
| 2018/0285971 | A1 | 10/2018 | Rosenoer |
| 2018/0285996 | A1 | 10/2018 | Ma |
| 2018/0294956 | A1 | 10/2018 | O'Brien et al. |
| 2018/0308140 | A1 | 10/2018 | Shkipin |
| 2018/0322597 | A1 | 11/2018 | Sher |
| 2019/0034911 | A1 | 1/2019 | Wilson |
| 2021/0256451 | A1 | 8/2021 | Tarmann et al. |
| 2021/0256552 | A1 | 8/2021 | Tarmann et al. |
| 2021/0272145 | A1 | 9/2021 | Tarmann et al. |
| 2021/0350456 | A1 | 11/2021 | Tarmann et al. |
| 2022/0114663 | A1 | 4/2022 | Tarmann et al. |

OTHER PUBLICATIONS

Office Action for U.S. Appl. No. 15/975,253, dated Nov. 17, 2021, Tarmann, "Identifying Multiple Mortgage Ready Properties" 8 pages.
Office Action for U.S. Appl. No. 17/168,642, dated Dec. 19, 2022, Tarmann, "Continuously Monitoring and Updating Mortgage Ready Data", 25 Pages.
"Bitcoins Academic Pedigree", Communications of the ACM, Dec. 2017, vol. 60, No. 12, 2017, 11 pgs.
Office Action for U.S. Appl. No. 15/975,504, dated Dec. 13, 2021, Tarmann, "Identifying Multiple Mortgage Ready Properties", 14 Pages.
Ali, et al., "Blockchain and mortgage lending process: A study of people, process, and technology involved", vol. 7, Issue 1, 2019, 15 pgs.
Office Action for U.S. Appl. No. 15/975,504, dated Mar. 2, 2023, Tarmann, "Identifying Multiple Mortgage Ready Properties", 12 Pages.
Haber, et al., "How to Time-Stamp a Digital Document", Hournal of Cryptology, 1991, pp. 99-111.
Office Action for U.S. Appl. No. 15/975,504, dated Sep. 9, 2021, Tarmann, "Identifying Multiple Mortgage Ready Properties", 12 pages.
Sakho, et al., "Blockchain: Perpectives and issues", Journal of Intelligent and Fuzzy Systems, 2019, 25 pgs.

(56) References Cited

OTHER PUBLICATIONS

Office Action for U.S. Appl. No. 17/168,961, dated Jul. 20, 2022, Tarmann, "Approving and Updating Dynamic Mortgage Applications", 26 pages.
Aru, HashCoin Uses Emercoin Blockchain for Vehicle Registration and Tracking, Cointelegraph, downloaded from the Internet at: <<https://cointelegraph.com/news/hashcoin-uses-0emercoin-blockchain-for-vehicle-registration-and-tracking/>> (Dec. 8, 2016).
Blockchain in the Insurance Section, Pricewaterhouse Coopers LLP brochure, 2 pp. (2016).
Cointelegraph, "How Blockchain Technology Works—Guide for Beginners", retrieved on Jul. 28, 2020 from <<cointelegraph.com/bitcoin-for-beginners/how-blockchain-technology-works>>.
Lee, "Banks Take Over the Blockchain", Euromoney, vol. 47, Iss. 566, Jun. 2016, 13 pages.
Mittal, et al., "Real Estate Management System based on Blockchain", 2020 IEEE &th Uttar Pradesh Section International Conference on Electrical, Electronics and Computer Engineering, (UPCON),2020, 6 pgs.
Office Action for U.S. Appl. No. 15/975,422, dated Apr. 21, 2021, Tarmann, "Incentivizing Agents Based Upon Updated Mortgage Ready Data", 29 Pages.
Office Action for U.S. Appl. No. 15/975,536, dated Apr. 21, 2021, Tarmann, "Incentivizing Agents Based Upon Mortgage Ready Data Updated", 27 Pages.
Non Final Office Action dated Jun. 9, 2020 for U.S. Appl. No. 15/975,523 "Identifying Multiple Mortgage Ready Properties", Tarmann, 13 pages.
Non Final Office Action dated Jun. 15, 2020 for U.S. Appl. No. 15/975,474, "Continuously Updating Mortgage Ready Data", Tarmann, 18 pages.
Office Action for U.S. Appl. No. 15/975,253, dated Jun. 17, 2021, Tarmann, "Identifying Multiple Mortgage Ready Properties", 15 Pages.
Non Final Office Action dated Jun. 19, 2020 for U.S. Appl. No. 15/975,344, "Continuously Monitoring and Updating Mortgage Ready Data", Tarmann, 29 pages.
Final Office Action dated Jun. 25, 2020 for U.S. Appl. No. 15/975,504, "Identifying Multiple Mortgage Ready Properties", Tarmann, 11 pages.
Non Final Office Action dated Oct. 7, 2020 for U.S. Appl. No. 15/975,422, "Incentivizing Agents Based Upon UpdatedMortgage Ready Data", Tarmann, 30 pages.
Non Final Office Action dated Oct. 7, 2020 for U.S. Appl. No. 15/975,536, "Incentivizing Agents Based Upon Mortgage Ready Data Updated", Tarmann, 27 pages.
Final Office Action dated Oct. 15, 2020 for U.S. Appl. No. 15/975,156, "Approving and Updating Dynamic Mortgage Applications", Tarmann, 63 pages.
Final Office Action dated Nov. 12, 2020 for U.S. Appl. No. 15/975,253, "Identifying Multiple Mortgage Ready Properties", Tarmann, 16 pages.
Office action for U.S. Appl. No. 15/975,386, dated Nov. 25, 2019, Tarmann, "Identifying Multiple Mortgage Ready Properties", 24 pages.

Office Action for U.S. Appl. No. 15/975,536, dated Nov. 29, 2019, Tarmann, "Incentivizing Agents Based Upon Mortgage Ready Data Updated", 25 Pages.
Office Action for U.S. Appl. No. 15/975,422, dated Nov. 29, 2019, Tarmann, "Incentivizing Agents Based Upon Updated Mortgage Ready Data", 26 Pages.
Office action for U.S. Appl. No. 15/975,536, dated Dec. 2, 2019, Tarmann, "Incentivizing an Agent Based Upon Mortgage Ready Data Updated", 34 Pages.
Non Final Office Action dated Dec. 27, 2019 for U.S. Appl. No. 15/975,504 "Identifying Multiple Mortgage Ready Properties" Tarmann, 10 pages.
Non Final Office Action dated Feb. 28, 2020 for U.S. Appl. No. 15/975,184 "Continuously Monitoring and Updating Mortgage Ready Data" Tarmann, 29 pages.
Non Final Office Action dated Mar. 9, 2020 for U.S. Appl. No. 15/975,316 "Approving and Updating Dynamic Mortgage Applications" Tarmann, 38 pages.
Office action for U.S. Appl. No. 15/975,536, dated Mar. 9, 2021, Tarmann, "Incentivizing an Agent Based Upon Mortgage Ready Data Updated", 22 Pages.
Non Final Office Action dated Apr. 29, 2020 for U.S. Appl. No. 15/975,156 "Approving and Updating Dynamic Mortgage Applications" Tarmann, 52 pages.
Office Action for U.S. Appl. No. 15/975,422, dated Jun. 1, 2020, Tarmann, "Incentivizing Agents Based Upon Updated Mortgage Ready Data", 25 Pages.
Office Action for U.S. Appl. No. 15/975,536, dated Jun. 1, 2020, Tarmann, "Incentivizing Agents Based Upon Mortgage Ready Data Updated", 24 Pages.
Final Office Action dated Jun. 12, 2020 for U.S. Appl. No. 15/975,278 "Incentivizing an Agent Based Upon Mortgage Ready Data Updated" Tarmann, 28 pages.
Non Final Office Action dated Jul. 29, 2020 for U.S. Appl. No. 15/975,442 "Approving and Updating Dynamic Mortgage Applications" Tarmann, 21 pages.
Final Office Action dated Jul. 31, 2020 for U.S. Appl. No. 15/975,316 "Approving and Updating Dynamic Mortgage Applications" Tarmann, 31 pages.
Oparah, "3 Ways That The Blockchain Will Change the Real Estate Market", Feb. 6, 2016, retrieved from <<https://techcrunch.com/2016/02/06/3-ways-that-blockchain-will-change-the-real-estate-market/2016/02/06/3-ways-that-blockchain-will-change-the-real-estate-market/>>.
Office Action for U.S. Appl. No. 17/168,642, dated Jul. 18, 2022, Tarmann, "Continuously Monitoring and Updating Mortgage Ready Data", 25 pgs.
Office Action for U.S. Appl. No. 15/975,504, dated Jul. 17, 2023, Tarmann, "Identifying Multiple Mortgage Ready Properties" 14 pages.
Office Action for U.S. Appl. No. 17/560,938, dated Jul. 26, 2023, Tarmann, "Approving and Updating Dynamic Mortgage Applications", 23 Pages.
Hotlon, et al., "Blockchain: The Impact on the Real Estate Industry", PillsburylawClientAlert, 2016, pp. 1-4.

* cited by examiner

CONTINUOUSLY UPDATING MORTGAGE READY DATA

CROSS-REFERENCE TO RELATED APPLICATIONS

This application is a divisional of currently pending U.S. patent application Ser. No. 15/975,474, filed on May 9, 2018, entitled "CONTINUOUSLY UPDATING MORTGAGE READY DATA", which claims priority to U.S. Provisional Patent Application No. 62/504,328, filed on May 10, 2017, and entitled "System and Method of Utilizing Blockchain Technology to Approve and Update Dynamic Mortgage Applications," U.S. Provisional Patent Application No. 62/514,470, filed on Jun. 2, 2017, and entitled "System and Method of Utilizing Blockchain Technology to Approve and Update Dynamic Mortgage Applications," U.S. Provisional Patent Application No. 62/535,018, filed Jul. 20, 2017, and entitled "System and Method of Approving and Updating Dynamic Mortgage Applications," and U.S. Provisional Patent Application No. 62/581,494, filed on Nov. 3, 2017, and entitled "Continuously Updating Mortgage Ready Data," the entire disclosures of which are expressly incorporated by reference herein for all purposes.

TECHNICAL FIELD

This disclosure relates to systems and methods for approving a mortgage application and, more particularly, at least in some embodiments, to systems and methods for approving and updating a mortgage application using computing and/or blockchain technologies.

BACKGROUND

During a conventional mortgage loan process, it may typically take at least 30 days to meet all the requirements necessary for a real estate property to close, e.g., officially transfer the property from one owner to another owner. More specifically, various items are needed to close the property, each of which may include a certain period of time to complete. For example, a home buyer's mortgage application must be approved, which may require the home buyer to submit various items of information to a bank for review. In addition, a home appraisal may be required, which may typically involve an inspector physically reviewing and evaluating the condition of the real estate property and preparing a report. Further, proof of a title search evidencing ownership of the property, for example, may be required along with proof of homeowner's and mortgage insurance.

As is well known in the industry, all of these components of the process may require some time and together often result in at least 30, sometimes 45 days, to enable the real estate property to be closed. This time delay has several drawbacks, including inconvenience, and often frustration, for those involved.

SUMMARY

The present embodiments relate to closing on a property at a faster rate than the typical time period of at least 30 days. Home buyers, e.g., mortgagees, often desire a faster close once securing a contract to buy a real estate property for various reasons. Such reasons include wanting to begin renovations on, or having to move into, the real estate property as soon as possible. Likewise, lenders, such as various banks, may also desire a faster closing process at least to generate and secure the revenue from the closing at a faster rate. In addition, faster closing processes may result in fewer problems during the time period leading up to the closing, resulting in fewer failed real estate transactions. Still further, like both home buyers and lenders, insurance companies may also be interested in a faster closing process.

In one aspect, the present embodiments may relate determining that a customer, a property or home, and/or a local government entity is "mortgage ready." For instance, a home may already have an appraisal performed on it recently, a customer may have submitted recent financial information, and/or a government entity may be set up for handling e-titles/electronic titles or otherwise be capable of handling electronic deeds. If the home buyer, home, and/or local government entity is maintained in a mortgage ready condition, the processing time for home closing may be streamlined.

In another aspect, a computer-implemented method of using a blockchain to determine a customer is approved for a mortgage may be provided. The method may include: (1) receiving, at one or more processors, a request for a mortgage associated with a customer identification number; (2) identifying, via the one or more processors, a blockchain associated with the customer, the customer's blockchain may be identified using the customer identification number; (3) accessing, at a memory coupled to the one or more processors, the blockchain corresponding to the customer identification number to retrieve information about the customer, the information including one or more of customer age, marital status, homeowner status, income level, occupation, finances or income, insurance status, education level, employment status, telematics data, credit score data, deposit account data for down payment, and current payment stub data; (4) verifying, via the one or more processors, no increased risk event occurred, the increased risk event including one or more of a decrease in the deposit account data for down payment, a declaration of bankruptcy, a decrease in credit score, an unemployment claim, or old or expired pay stub data; and/or (5) calculating, via the one or more processors, an amount the customer is approved for a mortgage loan based upon the retrieved information about the customer and indicating, via the one or more processors, the customer is mortgage ready. The method may include additional, less, or alternative actions, including those discussed elsewhere herein.

In another aspect, a computer-implemented method of using blockchain technology to determine a real estate property is mortgage ready may be provided. The method may include: (1) receiving, at one or more processors, a request for an appraisal associated with one or more of a real estate property identification number (PIN) and/or a multiple listing service (MLS) number; (2) identifying, via the one or more processors, a blockchain associated with the real estate property, the real estate property's blockchain may be identified using the PIN and/or MLS number; (3) accessing, at a memory coupled to the one or more processors, the blockchain corresponding to the PIN and/or MLS number to retrieve information about the real estate property, the information including one or more of list price, real estate property age, historical appraisal data, age of roof, age of siding, age of driveway, age of one or more appliances, basement remodel data, square footage data, number of bathrooms, number of bedrooms, flood or water damage data, neighborhood crime score, proximity to public transportation, proximity to airport, proximity to major metropolitan area, proximity to recreation, school district data, fire or flood claims in neighborhood, building materials data for new construction, and/or repairs data; (4) verifying, via the one or more processors, no increased risk event occurred, the increased risk event including one or more of an indication a claim for damages was filed or the property is in one or more of a hurricane zone, a flood zone, or an earthquake zone; (5) calculating, via the one or more processors, an appraisal value for the real estate property based upon the retrieved information about the real estate property from the blockchain; (6) comparing, via the one or more processors, the calculated appraisal value with the list price accessed from the blockchain corresponding to the PIN and/or MLS number; and/or (7) indicating, via the one or more processors, the real estate property is mortgage ready when the calculated appraisal value is equal to, or exceeds, the list price value. The method may include additional, less, or alternate actions, including those discussed elsewhere herein.

In another aspect, a computer-implemented method of approving a dynamic mortgage application may be provided. The method may include: (1) determining, via one or more processors, a customer is approved for a mortgage, including calculating, via the one or more processors, an amount in which the customer is approved for a mortgage loan based upon the information about the customer retrieved from the blockchain; (2) determining, via one or more processors, a real estate property is mortgage ready, including calculating, via the one or more processors, an appraisal value for the real estate property based upon the information about the real property retrieved from the blockchain; (3) comparing, via the one or more processors, the calculated amount the customer is approved for a mortgage loan with the calculated appraisal value of the real estate property; and/or (4) approving the mortgage application of the customer for the real estate property when the calculated amount the customer is approved for the mortgage loan meets, or exceeds, the calculated appraisal value of the real estate property, reducing a processing time and closing time of the mortgage. The method may include additional, less, or alternate actions, including those discussed elsewhere herein.

In yet another aspect, a computer-implemented method of using blockchain technology to continuously update information about a customer approved for a mortgage may be provided. The customer is associated with a customer identification number. The method may include: (1) monitoring, via one or more processors, information accessed from a blockchain corresponding to the customer identification number, the information used to determine the customer is approved for a mortgage and including one or more of customer age, marital status, homeowner status, income level, occupation, finances or income, insurance status, education level, employment status, telematics data, credit score data, deposit account data for down payment, and current payment stub data; (2) receiving, at the one or more processors, new information about the customer, the new information used to determine the customer is approved for a mortgage and including one or more of customer age, marital status, homeowner status, income level, occupation, finances or income, insurance status, education level, employment status, telematics data, credit score data, deposit account data for down payment, and current payment stub data; (3) updating, at a memory coupled to the one or more processors, a block of the blockchain to include the new information; and/or (4) recalculating, via the one or more processors, the amount in which the customer is approved for a mortgage based upon the new information received. The method may include additional, less, or alternate actions, including those discussed elsewhere herein.

In another aspect, a computer-implemented method of identifying multiple mortgage ready properties using a blockchain may be provided. Each mortgage ready property may be associated with a property identification number (PIN) and/or a multiple listing service (MLS) number. The method may include: (1) receiving, at one or more processors, information from a customer approved for a mortgage about preferences for a real estate property, the information including customer preference for one or more of real estate property list price, age, historical appraisal data, age of roof, age of siding, age of driveway, age of appliances, basement remodel data, square footage data, number of bathrooms, number of bedrooms, flood or water damage, neighborhood crime score, proximity to public transportation, proximity to airport, proximity to major metropolitan area, proximity to recreation, school district data, fire or flood claims in neighborhood, building materials for new construction, repairs data, and price range; (2) accessing, at a memory coupled to the one or more processors, a blockchain to retrieve a plurality of mortgage ready real estate properties meeting one or more of the customer preferences information; and/or (3) transmitting, via the one or more processors, the plurality of real estate properties meeting one or more of the customer preferences information to the customer. The method may include additional, less, or alternate actions, including those discussed elsewhere herein.

In still yet another aspect, a computer-implemented method of incentivizing an insurance agent to update a blockchain may be provided. The method may include: (1) receiving, at one or more processors, a message indicating an agent updated a blockchain with information about a customer or a real estate property; (2) increasing, via the one or more processors and according to an interval of time, a score of the agent for at least one item of information about one or more of the customer or the real estate property updated to the blockchain, the interval of time including one or more of real time, daily, weekly, bi-weekly, monthly, or quarterly; and/or (3) calculating, via the one or more processors, an agent rating based upon the score of the agent, the agent rating used to compute one or more of compensation or bonus of the agent. The method may include additional, less, or alternate actions, including those discussed elsewhere herein.

In still yet another aspect, a computer-implemented method of determining a customer is approved for a mortgage may be provided. The method may include receiving, at one or more processors, a request for a mortgage associated with a customer identification number, and identifying, via the one or more processors, a memory storage location associated with the customer, the customer's memory storage location may be identified using the customer identification number. The method may also include accessing, at a memory coupled to the one or more processors, the memory storage location corresponding to the customer identification number to retrieve information about the customer relative to obtaining a mortgage. The method may further include verifying, via the one or more processors, no increased risk event occurred, and calculating, via the one or more processors, an amount the customer is approved for a mortgage loan based upon the retrieved information about the customer and indicating, via the one or more processors, the customer is mortgage ready, reducing the processing time for a mortgage approval. The method may include additional, less, or alternate actions, including those discussed elsewhere herein.

In yet another aspect, a computer-implemented method of determining a real estate property is mortgage ready may be provided. The method may include receiving, at one or more processors, a request for an appraisal associated with one or more of a real estate property identification number (PIN) and/or a multiple listing service (MLS) number, and identifying, via the one or more processors, a memory storage location associated with the real estate property, the real estate property's computer file or memory location may be identified using the PIN and/or MLS number. The method may include accessing, at a memory coupled to the one or more processors, the memory storage location corresponding to the PIN and/or MLS number to retrieve information about the real estate property, and verifying, via the one or more processors, no increased risk event occurred. The method may further include calculating, via the one or more processors, an appraisal value for the real estate property based upon the retrieved information about the real estate property from the memory storage location, and comparing, via the one or more processors, the calculated appraisal value with the list price accessed from the memory storage location corresponding to the PIN and/or MLS number. The method may also include indicating, via the one or more processors, the real estate property is mortgage ready when the calculated appraisal value is equal to or exceeds the list price value. The method may include additional, less, or alternate actions, including those discussed elsewhere herein.

In still another aspect, a computer-implemented method of approving a dynamic mortgage application may be provided. The method may include determining, via one or more processors, a customer is approved for a mortgage, including calculating, via the one or more processors, an amount in which the customer is approved for a mortgage loan based upon the information about the customer retrieved from a memory storage location. The method may include determining, via one or more processors, a real estate property is mortgage ready, including calculating, via the one or more processors, an appraisal value for the real estate property based upon the information about the real property retrieved from the memory storage location, such as by using a machine learning or an artificial intelligence algorithm. The method may include comparing, via the one or more processors, the calculated amount the customer is approved for a mortgage loan with the calculated appraisal value of the real estate property. The method may also include approving the mortgage application of the customer for the real estate property when the calculated amount the customer is approved for the mortgage loan meets, or exceeds, the calculated appraisal value of the real estate property, reducing a processing time and closing time of the mortgage. The method may include additional, less, or alternate actions, including those discussed elsewhere herein.

In yet another aspect, a computer system for approving a dynamic mortgage application of a customer for a real estate property may be provided. The customer corresponds to a customer identification number record tracked by a computer, such as a computer employing one or more machine learning techniques, or via a memory storage location, and the real estate property corresponds to a real estate property identification number (PIN) record tracked by a computer, such as a computer employing one or more machine learning techniques, or via a memory storage location. The system may include a network interface configured to interface with one or more processors, a memory configured to store non-transitory computer executable instructions and configured to interface with the one or more processors, and the one or more processors configured to interface with the memory. In addition, the one or more processors are configured to execute the non-transitory computer executable instructions to cause the system to: determine a customer is approved for a mortgage loan based upon information about the customer retrieved from the memory storage location; determine a real estate property is mortgage ready based upon information about the real estate property retrieved from the memory storage location; compare a calculated amount the customer is approved for a mortgage loan with a calculated appraisal value of the real estate property; and/or approve the mortgage application of the customer for the real estate property when the calculated amount the customer is approved for the mortgage loan is equal to, or exceeds, the calculated appraisal value of the real estate property, reducing a processing time and closing time of the mortgage. The system may include additional, less, or alternate elements, including those discussed elsewhere herein.

In still yet another aspect, a computer-implemented method of continuously updating information about a customer approved for a mortgage may be provided. The customer may be associated with a customer identification number, and the method may include monitoring, via one or more processors, information accessed from a memory storage location corresponding to the customer identification number, with the information being used to determine the customer is approved for a mortgage. The method may further include receiving, at the one or more processors, new information about the customer, the new information used to determine the customer is approved for a mortgage. The method may also include updating, at a memory coupled to the one or more processors, the memory storage address to include the new information; and recalculating, via the one or more processors, the amount in which the customer is approved for a mortgage based upon the new information received. The method may include additional, less, or alternate actions, including those discussed elsewhere herein.

In yet another aspect, a computer-implemented method of continuously updating information about a real estate property identified as mortgage ready may be provided. The real estate property is associated with a real estate property identification number (PIN) and/or a multiple listing service (MLS) number. The method may include monitoring, via one or more processors, information about the real estate property corresponding to the PIN and/or MLS number, the information used to determine the real estate property is mortgage ready, and/or identifying, via the one or more processors, new information about the real estate property, the new information including any of the information used to determine the real estate property is mortgage ready. The method may further include updating, at a memory coupled to the one or more processors, a memory storage location to include the new information about the real estate property; and/or recalculating, via the one or more processors, the appraisal value for the real estate property based upon the new information received. The method may include additional, less, or alternate actions, including those discussed elsewhere herein.

In still yet another aspect, a computer system for continuously updating information about one or more of a customer approved for a mortgage and a real estate property identified as mortgage ready using computer technology and/or machine learning algorithms or artificial intelligence is disclosed. The customer may be associated with a customer identification number record tracked by a memory storage location, and the real estate property corresponds to a real estate property identification number (PIN) record tracked by a memory storage location. The system may include a network interface configured to interface with one or more processors of an insurance entity, and a memory configured to store non-transitory computer executable instructions and configured to interface with the one or more processors. The one or more processors may be configured to interface with the memory and to execute the non-transitory computer executable instructions to cause the system to: monitor information corresponding to one or more of the customer or the real estate property; identify new information about one or more of the customer or the real estate property; update a memory storage location to include the new information about one or more of the customer or the real estate property; and/or recalculate one or more of the amount in which the customer is approved for the mortgage or the appraisal value of the real estate property based upon one or more of new information received and the updated information from the memory storage location. The system may include additional, less, or alternate elements, including those discussed elsewhere herein.

In still another aspect, a computer-implemented method of identifying multiple mortgage ready properties using computer technology and/or machine learning algorithms or artificial intelligence is disclosed. Each mortgage ready property is associated with a property identification number (PIN) and/or a multiple listing service (MLS) number. The method may include receiving, at one or more processors, information from a customer approved for a mortgage about preferences for a real estate property, and accessing, at a memory coupled to the one or more processors, a memory storage location to retrieve a plurality of mortgage ready real estate properties meeting one or more of the customer preferences information. The method may include transmitting, via the one or more processors (and/or associated transceivers), the plurality of real estate properties meeting one or more of the customer preferences information to the customer. The method may include additional, less, or alternate actions, including those discussed elsewhere herein.

In still yet another aspect, a computer system for identifying multiple mortgage ready properties using computer technology and/or machine learning technologies may be provided. Each mortgage ready property may be associated with a property identification number (PIN) and/or a multiple listing service (MLS) number. The system may include a network interface configured to interface with one or more processors of an entity, and a memory configured to store non-transitory computer executable instructions and configured to interface with the one or more processors. The one or more processors are configured to interface with the memory. In addition, the one or more processors are configured to execute the non-transitory computer executable instructions to cause the system to: receive information from a customer approved for a mortgage about preferences for a real estate property; access a memory associated with a memory storage location to retrieve a plurality of real estate properties meeting one or more of the customer preferences information, each real estate property of the plurality of real estate properties being mortgage ready; and/or transmit the identified plurality of real estate properties meeting the customer preferences information to the customer. The method may include additional, less, or alternate actions, including those discussed elsewhere herein.

In still yet another aspect, a computer-implemented method of incentivizing an insurance agent to update a memory storage location may be provided. The method may include receiving, at one or more processors, a message indicating an agent updated a memory storage location with information about a customer or a real estate property. The method may also include increasing, via the one or more processors and according to an interval of time, a score of the agent for at least one item of information about one or more of the customer or the real estate property updated to the memory storage location. The interval of time may include one or more of real time, daily, weekly, bi-weekly, monthly, or quarterly. The method may also include calculating, via the one or more processors, an agent rating based upon the score of the agent, the agent rating used to compute one or more of compensation or bonus of the agent. The method may include additional, less, or alternate actions, including those discussed elsewhere herein.

In yet another aspect, a computer system for incentivizing an insurance agent to update a memory storage location may be provided. The system may include a network interface configured to interface with one or more processors of an entity and a memory configured to store non-transitory computer executable instructions and configured to interface with the one or more processors. The one or more processors are configured to interface with the memory and to execute the non-transitory computer executable instructions to cause the system to: receive one or more of a message or a signal indicating an agent updated a memory storage location with information about one or more of a customer or a real estate property; increase a score of the agent for at least one item of information about one or more of the customer or the real estate property updated to the memory storage location; and/or calculate an agent rating based upon the score of the agent. The system may include additional, less, or alternate elements, including those discussed elsewhere herein.

Advantages will become more apparent to those skilled in the art from the following description of the preferred embodiments which have been shown and described by way of illustration. As will be realized, the present embodiments may be capable of other and different embodiments, and their details are capable of modification in various respects. Accordingly, the drawings and description are to be regarded as illustrative in nature and not as restrictive.

BRIEF DESCRIPTION OF THE DRAWINGS

The Figures described below depict various aspects of the system and methods disclosed therein. It should be understood that each figure depicts an example of a particular aspect of the disclosed system and methods, and that each of the figures is intended to accord with a possible example thereof. Further, wherever possible, the following description refers to the reference numerals included in the following figures, in which features depicted in multiple figures are designated with consistent reference numerals.

There are shown in the drawings arrangements which are presently discussed, it being understood, however, that the present examples are not limited to the precise arrangements and instrumentalities shown, wherein.

The Figures depict preferred embodiments for purposes of illustration only. One skilled in the art will readily recognize from the following discussion that alternative embodiments of the systems and methods illustrated herein may be employed without departing from the principles of the invention described herein.

DETAILED DESCRIPTION

Generally, the present disclosure and exemplary aspects relate to, inter alia, systems and methods for utilizing blockchain technology to approve a dynamic mortgage application. For example, a blockchain may be used to approve a customer for a mortgage amount, determine and identify a real estate property as mortgage ready (e.g., having a calculated appraisal value using information about the real estate property accessed from the blockchain that meets, or exceeds, a list price of the real estate property), approve a dynamic mortgage application, monitor and update the mortgage ready data relative to both the customer and the real estate property, and identify multiple mortgage ready properties based upon customer input, and incentivize and rate insurance agents based upon the customer and real estate property mortgage ready data received from the agent. In one example, the systems and methods described herein allow for using a private blockchain of an insurance entity, which gives the option for private information and permissioned participants in the blockchain.

The disclosed systems and methods may use an application of distributed ledgers, where each new block may be cryptographically linked to the previous block in order to form a "blockchain," as described in more detail below. More particularly, to create a new block, each transaction within a block may be assigned a hash value (i.e., an output of a cryptographic hash function). These hash values may then be combined utilizing data storage and cryptographic techniques (e.g., a Merkle Tree) to generate a hash value representative of the entire new block, and, consequently, the transactions stored in the block. This hash value may then be combined with the hash value of the previous block to form a hash value included in the header of the new block, thereby cryptographically linking the new block to the blockchain. To this end, the precise value utilized in the header of the new block is dependent on the hash value for each transaction in the new block, as well as the hash value for each transaction in every prior block.

Figure 1A:
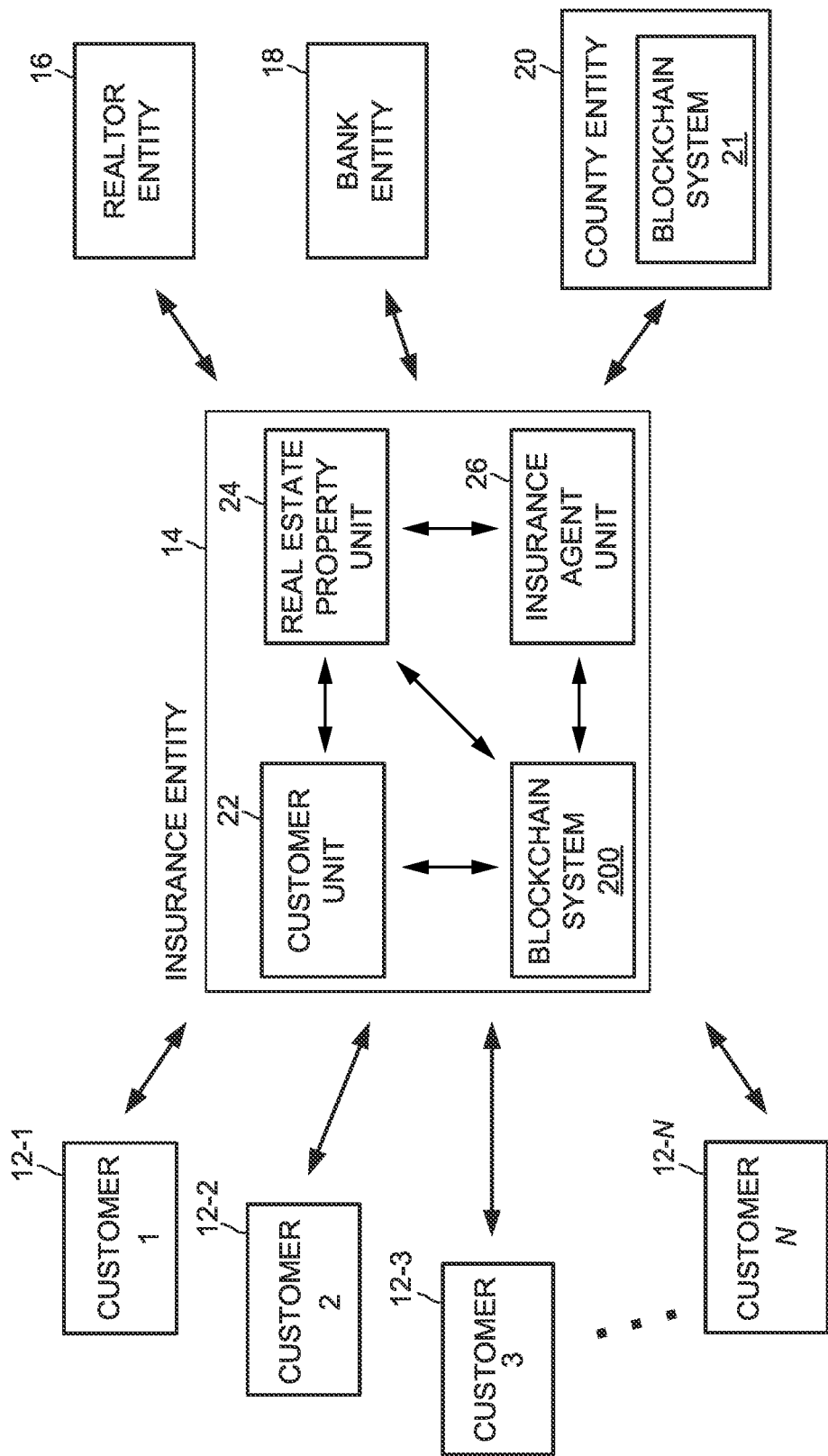
FIG. 1A is an exemplary computing environment including components associated with a system and method of approving a dynamic mortgage application using blockchain technology in accordance with one aspect of the present disclosure.

Exemplary Environment for Approving a Dynamic Mortgage Application Using Blockchain Technology FIG. 1A depicts an exemplary computing environment 10 including components associated with approving a dynamic mortgage application using blockchain technology in accordance with one aspect of the present disclosure. As illustrated in FIG. 1A, the environment 10 may include N computing devices 12-1 through 12-N associated with N respective customers (e.g., thousands of customers, millions of customers, etc.). Each of the computing devices 12-1 through 12-N may be any suitable type of computing device having wired and/or wireless communication capabilities, such as a personal computer, tablet, phablet, smartphone, etc.

The environment 10 may also include a computing system 14 associated with an insurance entity. The computing system 14 may include one or more servers of the insurance entity, or may include a plurality of networked computing devices that have an appearance of a single, logical computing device or system, e.g., a group of cloud computing devices. The computing system 14 may be communicatively coupled to computing devices 12-1 through 12-N via a network (not shown in FIG. 1A). The network may be a single communication network, or may include multiple communication networks of one or more types (e.g., one or more wired and/or wireless local area networks (LANs), and/or one or more wired and/or wireless wide area networks (WANs) such as the Internet), for example.

The environment 10 may also include a computing system 16 associated with a realtor entity, a computing system 18 associated with a bank entity, and a computing system 20 associated with a county entity. Each of the computing systems 16, 18 and 20 may include one or more servers or computing devices and may be communicatively coupled to computing system 14 of the insurance entity via a network (not shown in FIG. 1A). The network may be a single communication network, or may include multiple communication networks of one or more types (e.g., one or more wired and/or wireless LANs, and/or one or more wired and/or wireless WANs such as the Internet), for example.

The computing system 14 may include various units, including a customer unit 22, a real estate property unit 24, and an insurance agent unit 26. Each of some or all of the units 22, 24 and 26 may include a respective set of one or more computing devices or processors that execute software instructions to perform the corresponding functions described herein. Alternatively, each of some or all of the units 22, 24 and 26 may be or include a respective component of software that is stored on one or more computer-readable media (e.g., a random access memory (RAM) and/or read-only memory (ROM) of the computing system 14) and executed by one or more processors of the computing system 14 to perform the corresponding functions described herein. Further, one or more of the units may be combined into a single unit, or may be omitted. In addition, the computing system 14 of the insurance entity may further include a blockchain system 200, which is explained more below and in FIG. 3A, for example. The blockchain system 200 may be a part of one or more of the units 22, 24, 26 or only one of the units when the units are combined into a single unit, for example.

Generally, in one embodiment, customer unit 22 collects information regarding the customers operating computing devices 12-1 through 12-N (with customer permission, affirmative consent, or via the customer), stores the collected information in a customer profile database that includes a separate profile for each customer, and updates the blockchain system 200 with the customer information, creating a digital identity for each customer on the blockchain system 200, for example. The customer profile database may be any suitable type of persistent memory. The customer unit 22 may obtain the customer information in any of one or more ways. For example, customer unit 22 may obtain demographic information (e.g., gender, birth date) and information about customer's finances and employment via on-line forms (e.g., insurance applications, mortgage applications) filled out by the customers using computing devices 12-1 through 12-N. The customer unit 22 may provide the on-line forms as one or more web pages (e.g., HTML files, JavaServer Pages files, etc.) stored in a memory of the computing system 14, and the consumers may use web browser applications executing on the computing devices 12-1 through 12-N to access the web page(s), for example.

Via the on-line forms, or via other suitable means, customer unit 22 may also collect insurance preferences and/or requirements of the various customers. For example, each customer may enter his or her preferred or required coverage types, coverage limits, deductibles, insurance provider ratings (e.g., AAA), and/or any other preference or requirement relating to insurance. A customer may indicate that he or she prefers to have a policy through an insurance company that offers live insurance agents, for example. In one alternative embodiment and/or scenario, some or all of the consumers provide information via physical application forms, and some or all of the computing devices 12-1 through 12-N may be omitted in the example environment 10. Generally, the customer unit 22 may store the individual preferences of a particular customer (or indications thereof) in a respective customer profile of the customer profile database of the customer unit 22, for example.

Further, the customer unit 22 may collect other information that is also to be stored in the customer database (with customer permission). For a customer already having an insurance policy with the insurance entity 14, such as an insurance provider, for example, customer unit 22 may receive or obtain information from the customer's insurance account and/or policy. For example, claims information from that provider (e.g., number and/or dates of past claims, past claim payouts made to or on behalf of the consumer, etc.) may be obtained. Alternatively, or additionally, customer unit 22 may receive telematics data relative to the customer's existing real estate property and health or lifestyle habits. Generally, the customer unit 22 may store individual characteristics of a particular customer (or indications thereof) in a respective customer profile within the customer profile database. Individual customer characteristics or customer information may include, for example, customer age, marital status, homeowner status, geographical location, income level, occupation, finances or income, insurance status, education level, employment status, telematics data, credit score data, deposit account data for down payment, and current payment stub data. Customer unit 22 may then update the blockchain system 200 of the insurance entity 14 to include all of the customer information about each of the customers, creating the digital identity for each customer on the blockchain system 200, for example.

With the foregoing, a customer may opt-in to a rewards, insurance discount, or other type of program. After the customer provides their affirmative consent, an insurance provider remote server may collect data from the customer's mobile device, smart home controller, smart or autonomous vehicle, or other smart devices—such as with the customer's permission or affirmative consent. The data collected may be related to smart home functionality (or home occupant preferences or preference profiles), smart or autonomous vehicle functionality, and/or insured assets before (and/or after) an insurance-related event, including those events discussed elsewhere herein. In return, risk averse insureds, home owners, or home or apartment occupants may receive discounts or insurance cost savings related to home, renters, personal articles, auto, and other types of insurance from the insurance provider, and such information may be further collected by the insurance entity 14, such as by the customer unit 22.

In one aspect, smart or interconnected home data, and/or other data, including the types of data discussed elsewhere herein, may be collected or received by an insurance provider remote server, such as via direct or indirect wireless communication or data transmission from a smart home controller, mobile device, smart or autonomous vehicle, or other customer computing device, after a customer affirmatively consents or otherwise opts-in to an insurance discount, reward, or other program. The insurance entity 14, such as the insurance provider, may then analyze the data received with the customer's permission to provide benefits to the customer. As a result, risk averse customers may receive insurance discounts or other insurance cost savings based upon data that reflects low risk behavior and/or technology that mitigates or prevents risk to (i) insured assets, such as homes, personal belongings, or vehicles, and/or (ii) home or apartment occupants. Such information may be further collected by the insurance entity 14, such as by the customer unit 22.

In a similar manner, the real estate property unit 24 may collect information regarding various real estate properties the insurance entity 14 is currently insuring. Alternatively, or additionally, the real estate property unit 24 may collect real estate property information transmitted to the insurance entity 14 by one or more of the computing system 16 associated with the realtor entity, the computing system 18 associated with the bank entity, or the computing system 20 associated with the county entity. The real estate property unit 24 may then store the collected information about each real estate property in a database of the real estate property unit 24, for example, that includes a separate profile for each real estate property. The database may again be any suitable type of persistent memory. In addition, the real estate property unit 24 may then update the blockchain system 200 with the real estate property information collected, creating a digital identity for each real estate property on the blockchain system 200, in one example.

The real estate property unit 24 may obtain the real estate property information in any of one or more ways. For example, real estate property unit 24 may obtain information about the real estate property via on-line forms (e.g., appraisal and mortgage applications) filled out by individuals operating the computing system 16 of the realtor entity and/or the computing system 18 of the bank entity, e.g., the bank entity providing the mortgage associated with the real estate property. Alternatively, and/or additionally, the real estate property unit 24 may obtain the real estate property information by accessing a blockchain 21 of the computing system 20 of the county entity, as explained more below. Still further, the real estate property unit 24 may obtain the real estate property information from the insurance agent unit 26 associated with the insurance entity. In that example, the insurance agent providing the homeowner's and/or mortgage insurance for the real estate property may provide information to the real estate property unit 24 about the real estate property. Such real estate property information may include one or more of the real estate property age, historical appraisal data, age of roof, age of siding, age of driveway, age of one or more appliances, basement remodel data, square footage data, number of bathrooms and/or bedrooms, flood or water damage data, neighborhood crime score, proximity to public transportation, proximity to airport, proximity to major metropolitan area, proximity to recreation, school district data, fire or flood claims in neighborhood, building materials data for new construction, repairs data and/or any other real estate property characteristics.

Further, the real estate property unit 24 may collect other information that is also to be stored in a database and updated to the blockchain system 200 of the insurance entity 14, for example. In one example, for a real estate property already having an insurance policy with the insurance entity 14, such as an insurance provider, for example, the real estate property unit 24 may receive or obtain information from the real estate property's insurance account and/or policy. For example, claims information from that provider (e.g., number and/or dates of past claims, past claim payouts made relative to the real estate property) may be obtained. Alternatively, or additionally, real estate property unit 24 may receive telematics data relative to the customer's existing real estate property and health or lifestyle habits. Generally, the real estate property unit 24 may then store individual characteristics of a particular real estate property (or indications thereof) and update the blockchain to include the information about the real estate property.

Figure 1B:
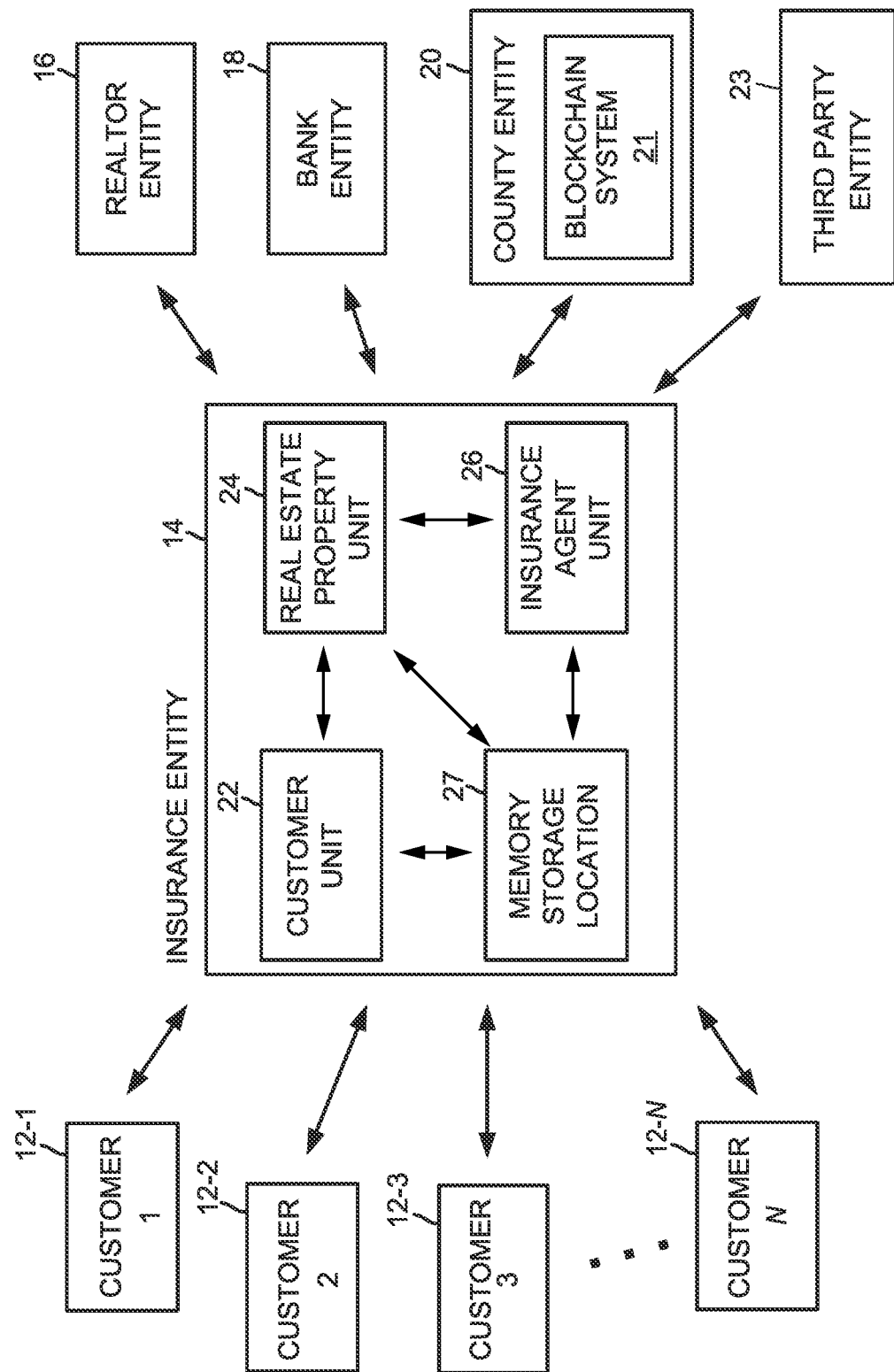
FIG. 1B is an exemplary computing environment including components associated with a system and method of approving a dynamic mortgage application in accordance with another aspect of the present disclosure.

Referring now to FIG. 1B, another exemplary computing environment including components associated with a system and method of approving a dynamic mortgage application in accordance with another aspect of the present disclosure is depicted. This exemplary computing environment is identical to the exemplary computing environment of FIG. 1A, except the insurance entity 14 does not include the blockchain system 200 as depicted in FIG. 1A, but rather a more general memory storage location 27, as explained more below. As such, parts of the exemplary environment of FIG. 1B that are the same as parts of the exemplary environment of FIG. 1A have the same reference numbers and no further explanation is provided herein for the sake of brevity. Different parts, namely the memory storage location 27, however, have different reference numbers and are explained more below and throughout the description.

In particular, and in one example, the memory storage location 27 of the insurance entity 14 may include one or more of a computer file, a memory, a memory location, or an address that may be associated with one or more of the customer or the real estate property or properties. In another example, the memory storage location 27 may include one or more of a blockchain system 200, a computer file, a memory, a memory location, or an address separate from the blockchain system 200, for example. In yet another example, each of the computing systems 16, 18, 20 of the realtor entity, bank entity, and county entity, respectively, may include one or more of a blockchain system or a memory storage location for example, as is explained more in the context of the exemplary computer system of FIG. 2.

Still further, an additional computing system 23 of a third party entity 21 may also be included in the exemplary computing environment of FIG. 1B. Like the computing systems 16, 18, 20, the computing system 23 of the third party entity may include one or more of a separate memory storage location and/or a blockchain system separate from one or more of the blockchain systems of one or more of the computing systems 14, 16, 18, 20 corresponding, respectively, to the insurance entity, realtor entity, bank entity or county entity.

In addition, the computing system 23 of the third party entity may include one or more of Equifax, Instatouch, Maxwell, FinLocker, or any other third party able to provide information needed for determining or calculating whether the customer or real estate property is mortgage ready, as further defined herein. Such information may include any information relative to a digital identify of one or more of the customer or the real estate property, as further explained below.

Figure 2:
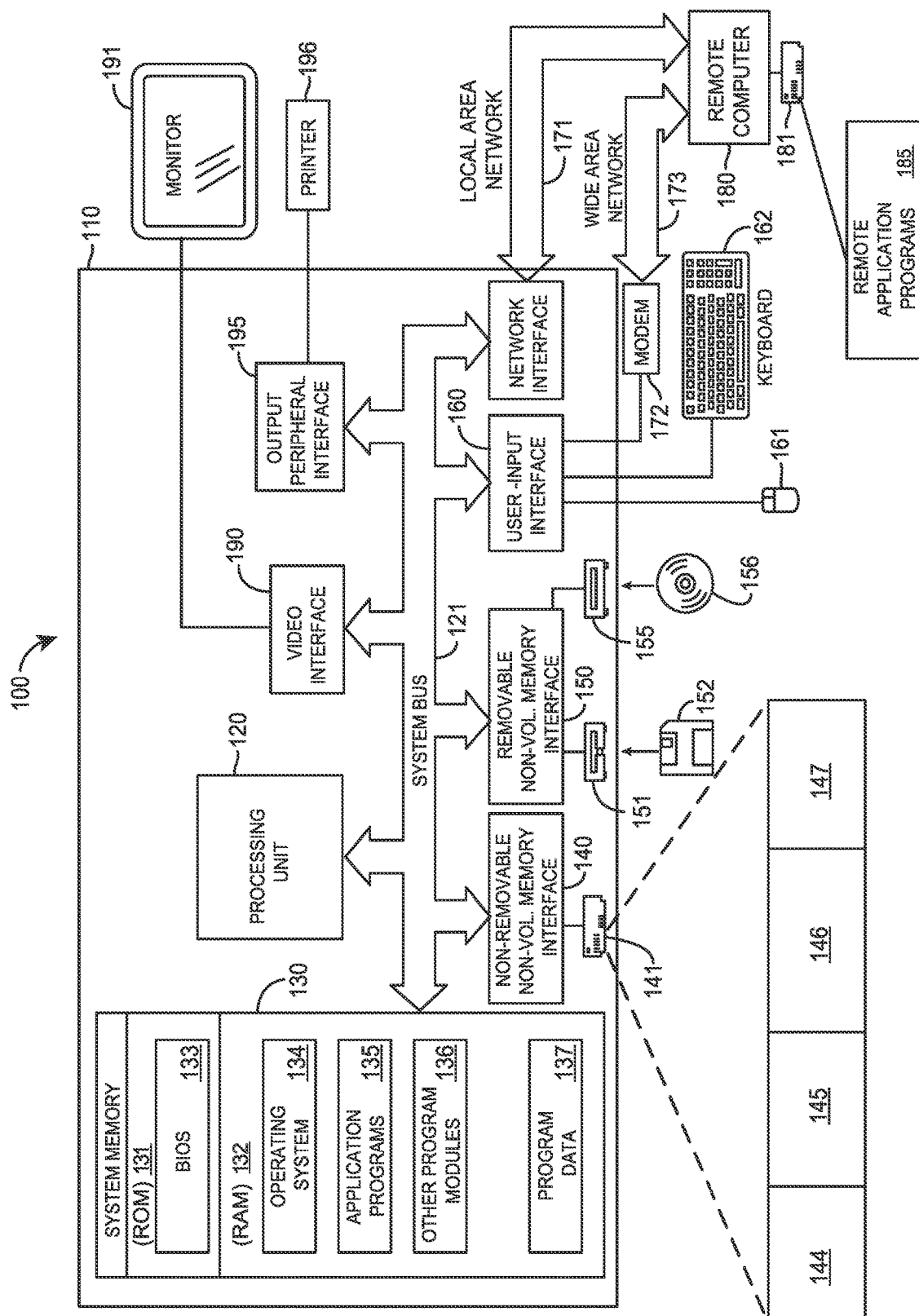
FIG. 2 depicts an exemplary computer system in which some of the techniques described herein may be implemented in accordance with one aspect of the present disclosure.

Exemplary Computer System for Approving a
Dynamic Mortgage Application Utilizing
Blockchain Technology FIG. 2 depicts an exemplary computer system 100 in which the techniques and methods described herein may be implemented, according to one embodiment. In one embodiment, the computer system 100 may be included in the system 10 of one or both of FIGS. 1A and 1B. For example, any one or more of the units 22-26 may comprise one or more instances of the computer system 100, or the insurance entity 14 may comprise one or more instances of the computer system 100. In addition, any one or more of the computing systems 16, 18, 20, 21 of the realtor entity, the bank entity, the county entity, and the third party entity, respectively, may comprise one or more instances of the computer system 100. Further, any one or more of the computing devices of customers 12-1 through 12-N may comprise one or more instances of the computer system 100.

The computer system 100 of FIG. 2 includes a computing device in the form of a computer 110. Components of the computer 110 may include, but are not limited to, a processing unit 120, a system memory 130, and a system bus 121 that couples various system components including the system memory 130 to the processing unit 120. The system bus 121 may be any of several types of bus structures including a memory bus or memory controller, a peripheral bus, or a local bus, and may use any suitable bus architecture. In one example, the system memory 130 is the memory storage location of each computing device 12.

Computer 110 typically includes a variety of computer-readable media. Computer-readable media can be any available media that can be accessed by computer 110 and may include both volatile and nonvolatile media, and both removable and non-removable media. By way of example, and not limitation, computer-readable media may comprise computer storage media and communication media. Computer storage media includes tangible, volatile and nonvolatile, removable and non-removable media implemented in any method or technology for non-transitory storage of information such as computer-readable instructions, data structures, program modules or other data. Computer storage media includes, but is not limited to, RAM, ROM, EEPROM, FLASH memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. More generally and in one example, one or more of the aforementioned listing of computer storage media may be the memory storage location as defined herein. Communication media typically embodies computer-readable instructions, data structures, program modules or other data in a modulated data signal such as a carrier wave or other transport mechanism, and includes any information delivery media. By way of example, and not limitation, communication media may include wired media such as a wired network or direct-wired connection, and wireless media such as acoustic, radio frequency (RF), infrared and other wireless media. Combinations of any of the above are also included within the scope of computer-readable media.

The system memory 130, which may include the memory storage location in one example, may include computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to, and/or presently being operated on, by processing unit 120. By way of example, and not limitation, FIG. 2 illustrates operating system 134, application programs 135, other program modules 136, and program data 137.

The computer 110 may also include other removable/non-removable, volatile/nonvolatile computer storage media. By way of example only, FIG. 2 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 may be connected to the system bus 121 through a non-removable memory interface such as interface 140, and magnetic disk drive 151 and optical disk drive 155 may be connected to the system bus 121 by a removable memory interface, such as interface 150.

The drives and their associated computer storage media discussed above and illustrated in FIG. 2 provide storage of computer-readable instructions, data structures, program modules and other data for the computer 110. In FIG. 2, for example, hard disk drive 141 is illustrated as storing operating system 144, application programs 145, other program modules 146, and program data 147. Note that these components may either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as cursor control device 161 (e.g., a mouse, touch pad, etc.) and keyboard 162. A monitor 191 or other type of display device is also connected to the system bus 121 via an interface, such as a video interface 190. In addition to the monitor, computers may also include other peripheral output devices such as printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 2. The logical connections depicted in FIG. 2 include a local area network (LAN) 171 and a wide area network (WAN) 173, but may also include other networks. Such networking environments are commonplace in hospitals, offices, enterprise-wide computer networks, intranets and the Internet.

When used in a LAN networking environment, the computer 110 is connected to the LAN 171 through a network interface or adapter 170. When used in a WAN networking environment, the computer 110 may typically include a modem 172 or other means for establishing communications over the WAN 173, such as the Internet. The modem 172, which may be internal or external, may be connected to the system bus 121 via the input interface 160, or other appropriate mechanism. The communications connections 170, 172, which allow the device to communicate with other devices, are an example of communication media, as discussed above. In a networked environment, program modules depicted relative to the computer 110, or portions thereof, may be stored in the remote memory storage device 181. By way of example, and not limitation, FIG. 2 illustrates remote application programs 185 as residing on memory device 181.

In some configurations, the computer 110 may be included in a plurality of networked computers or computing devices that have the logical appearance as a single, integral computing node, e.g., a cloud computing system. For example, the application programs 145, other program modules 146 and/or program data 137 may be stored in and executed by the logical, single computing node.

The techniques and methods for approving and updating a dynamic mortgage application using blockchain technology described herein may be implemented in part within a computer system such as the computer system 100 illustrated in FIG. 2. The computer 110 may be a server or computing device of the insurance entity 14 (e.g., within the computing system 14 of FIG. 1), and the remote computer 180 may be a server or computing device of one or more of the computing systems 16, 18 and 20 of FIG. 1, for example. In some such embodiments, the LAN 171 may be omitted (e.g., communications may between computer 110 and computer 3180 may only occur via WAN 173). Application programs 135 and 145 may include programs that implement customer unit 22, the real estate property unit 24, and the insurance agent unit 26 of FIG. 1, for example. Databases in each of the units 22-26 may be stored on hard disk drive 141, magnetic disk 152 or optical disk 156, for example.

In general, any of the storage media described above including but not limited to the system memory 130, the ROM 131, the RAM 132, the hard disk drive 141, the magnetic disk 152 or the optical disk 156 may comprise the memory storage location as defined herein.

Exemplary Distributed Ledger

Figure 3A:
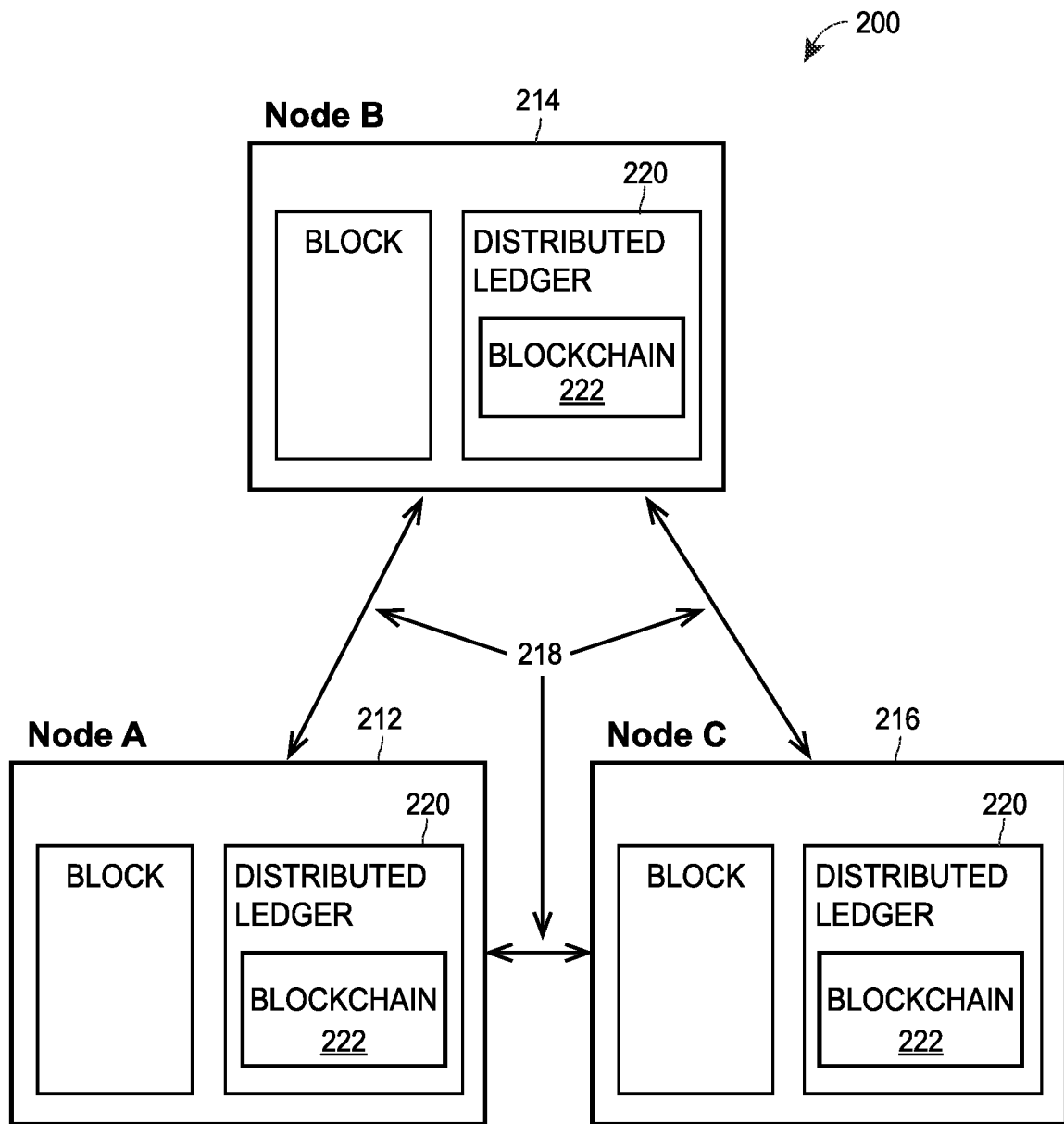
FIG. 3A depicts an exemplary distributed ledger system, such as a blockchain system, in accordance with one aspect of the present disclosure.

Referring now to FIG. 3A, an exemplary distributed ledger system 200, such as a blockchain system, in accordance with one aspect of the present disclosure is depicted. An example of a distributed ledger system 200 is the blockchain system 200 of FIG. 1 described above. FIG. 3A includes a plurality of nodes 212, 214, and 216, network connections 218, and a distributed ledger 220 having a blockchain 222. In a distributed ledger system 200, each node maintains a copy of the distributed ledger 220, which includes a copy of the blockchain 222. As changes are made to the distributed ledger 200, each node updates their respective copy of the distributed ledger 220. A consensus mechanism may be used by the nodes in the distributed ledger system 200 to decide whether it is appropriate to make changes to the distributed ledger 220, as explained more below.

Therefore, each node has their own copy of the distributed ledger 220, which is identical to every other copy of the distributed ledger 220 stored by each other node. The distributed ledger system 220 is more robust than a central authority database system, for example, because the distributed ledger system 220 is decentralized. As such, there is no single point of failure.

Exemplary Sequence Diagram

Figure 3B:
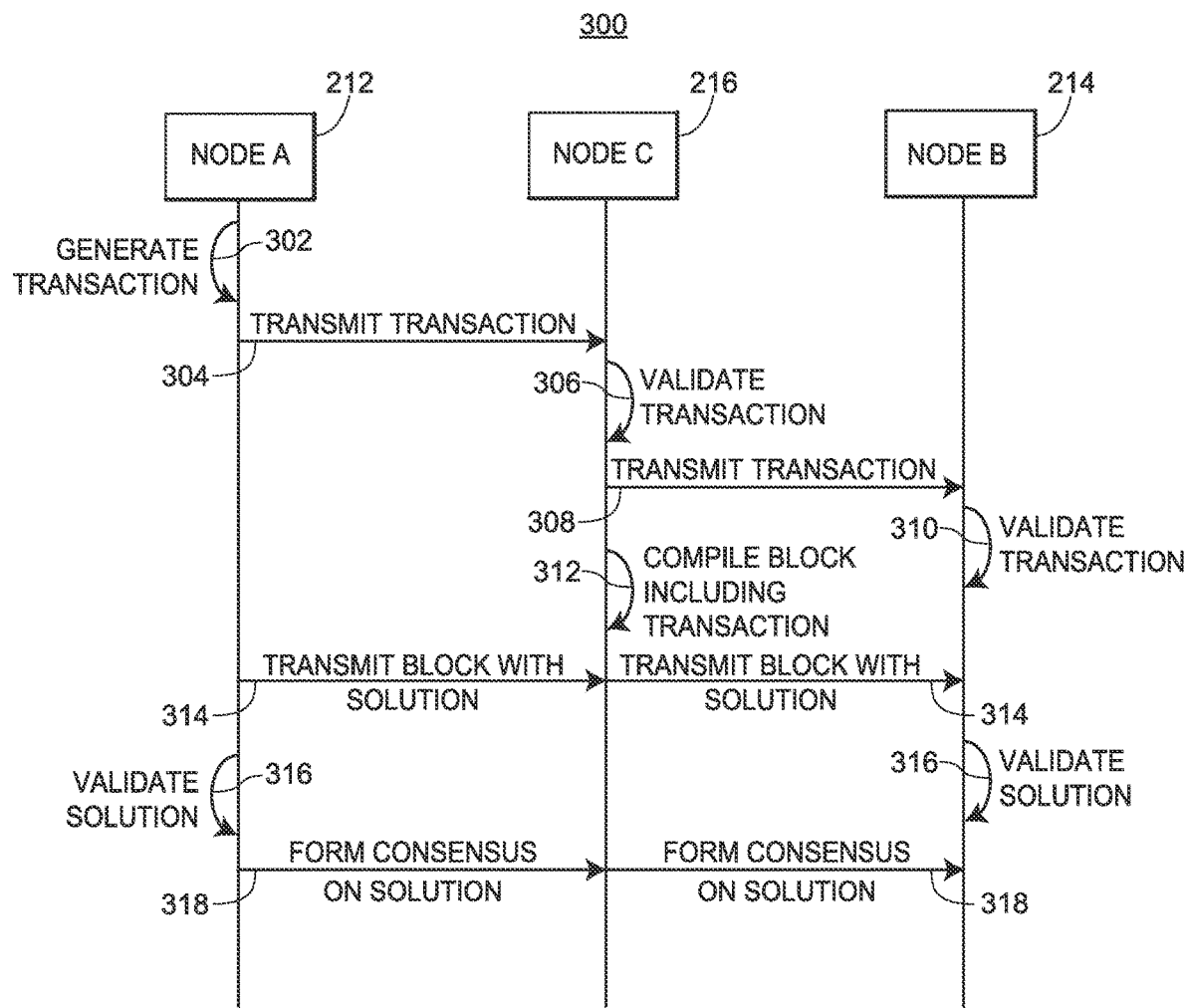
FIG. 3B depicts an exemplary sequence diagram of the distributed ledger system of FIG. 3A.

FIG. 3B depicts an exemplary sequence diagram 300 in accordance with one aspect of the blockchain system 200 of the present disclosure. FIG. 3B includes a set of nodes 212, 214 and 216. At 302, Node A 212 may generate a transaction. The transaction may be transmitted from Node A 212 to Node C 216 at 304. Node C 216 may validate the transaction at 306, and, if the transaction is valid, transmit the transaction at 308 to Node B 214. Node B 214 may validate the transaction at 310. At 312, Node C 216 may compile a block including the validated transaction. Compiling a block may include generating a solution to a cryptographic puzzle, and linking the block to other blocks, as described above. Once the block is compiled, Node C 216 may transmit the block with the solution at 314 to both Node A 212 and Node B 214.

Both Node A 212 and Node B 214 may then validate the solution to the block at 316. Verifying may include checking a cryptographic key-pair as described above. At 318 the three nodes form a consensus that the solution is valid, thereby forming a consensus on the blocks of transactions stored by all the nodes.

Exemplary Node

Figure 4:
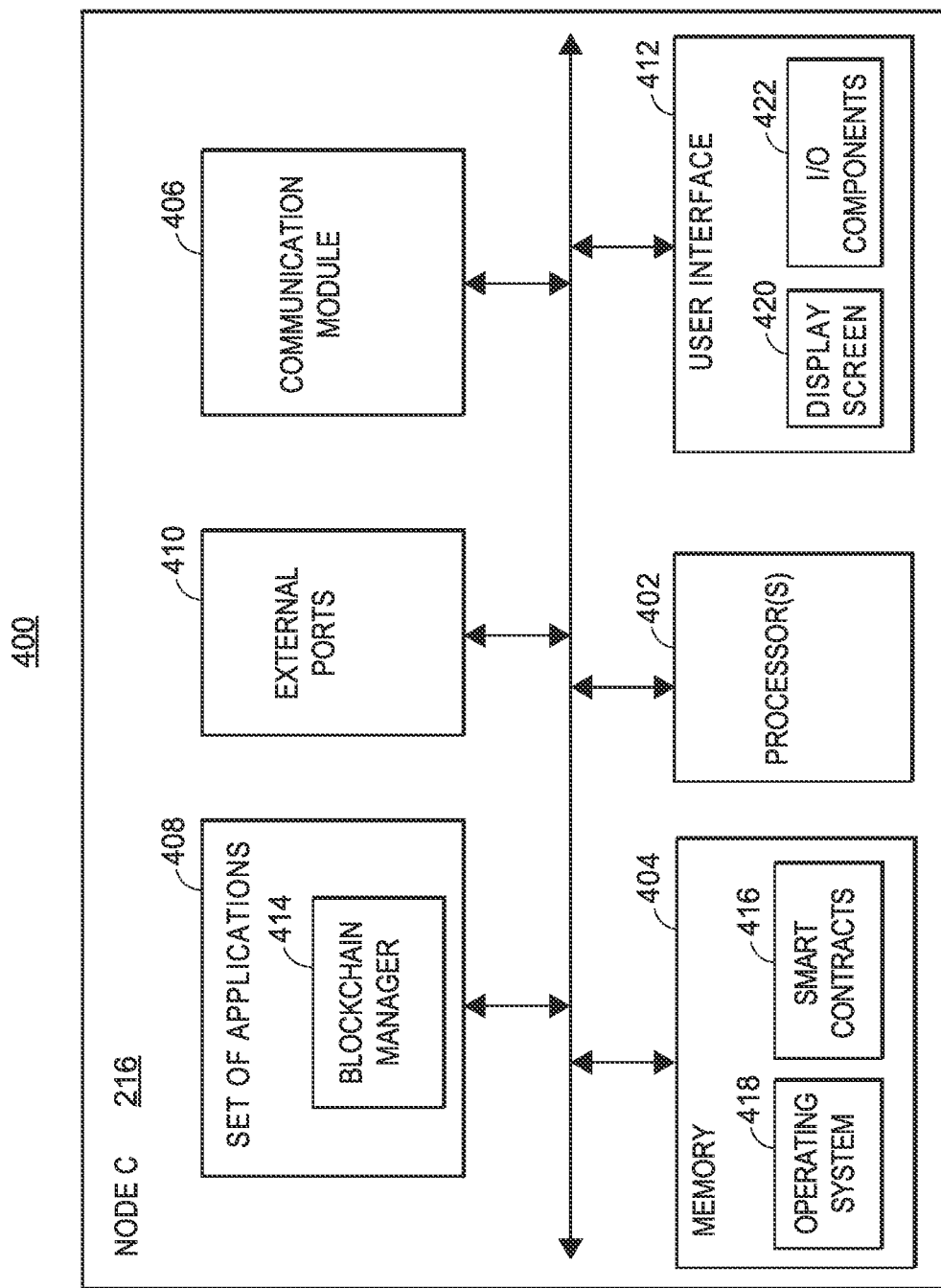
FIG. 4 depicts an exemplary node of the distributed ledger system of FIG. 3 in accordance with an aspect of the present disclosure.

FIG. 4 depicts an exemplary node 400 in accordance with one aspect of the present disclosure. In some embodiments, node 400 may be the same type of node as Node C 216 in FIG. 3B. In other embodiments, node 400 may be the same type of node as Node A 212 and Node B 214 in FIG. 3B. Node 400 may be capable of performing the functionality disclosed herein. In particular, node 400 may be utilized in the decentralized system described in FIG. 3A, and/or the blockchain system 500 described below in FIG. 5.

The node 400 may include at least one processor 402, memory 404, a communication module 406, a set of applications 408, external ports 410, user interface 412, a blockchain manager 414, smart contracts 416, operating system 418, a display screen 420, and input/output components 422. In some embodiments, the node 400 may generate a new block of transactions of the blockchain by using the blockchain manager 414. Similarly, the node 400 may use the blockchain manager 414 in conjunction with the smart contracts 416 stored in memory 404 to execute the functionality disclosed herein.

In other embodiments, the smart contracts 416 operate independent of the blockchain manager 414 or other applications. In some embodiments, node 400 does not have a blockchain manager 414, or smart contracts 416 stored at the node. In some embodiments, the node 400 may have additional or less components than what is described. The components of the node 400 are described in more detail below.

The node 400, as part of a decentralized ledger system 200, or another decentralized or centralized network, may be used as part of systems that interact with and/or manipulate data and transactions associated with the approving a dynamic mortgage application, including determining a customer is approved for a mortgage and determining real estate property is mortgage ready, as described more below.

Exemplary Blockchain System

Figure 5:
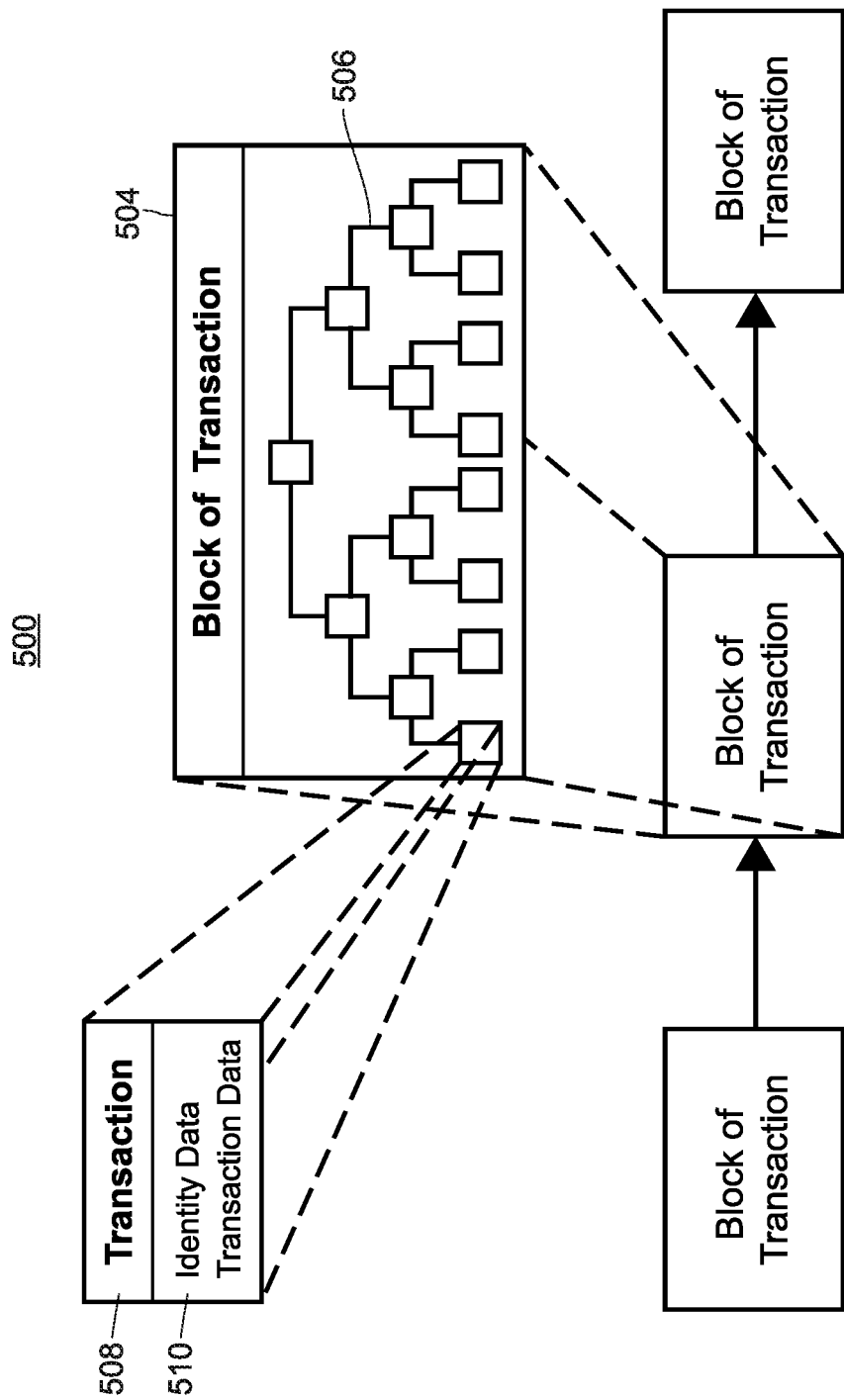
FIG. 5 depicts an exemplary blockchain in accordance with one aspect of the present disclosure.

FIG. 5 depicts an exemplary blockchain system 500 in accordance with one aspect of the present disclosure. FIG. 5 includes a blockchain 502 having at least one block of transactions 504. The blockchain 502 may be the blockchain system 200 described above and depicted in FIG. 3A, for example, or the blockchain of FIG. 4. The blockchain 502 further includes a Merkle Tree 506 and a transaction 508. The Merkle Tree may be the above-referenced Merkle Tree that cryptographically links transactions together. In other examples, the blockchain system 500 may utilize a different method of organizing transactions in a block. In some examples, the blockchain system 500 includes a plurality of blocks connected together to form a chain of blocks of transactions 502.

Each block of transactions 504 may include at least one transaction 508. In other embodiments, each block of transactions 504 has a size limit that necessarily limits the number of transactions that the block may store. Each block of transactions 504 includes a reference to a previous block of transactions that was added to the blockchain 502 prior to the block of transactions 504 being added to the blockchain 502. As such, and as described above, each block of transactions 504 is linked to every other block in the blockchain 502.

In some embodiments, the block of transactions 504 may organize the transactions it has received into a Merkle Tree 506 to facilitate access to the stored transactions. The transactions may be hashed using a cryptographic hash algorithm, and the hash of each transaction may be stored in the tree. As the tree is constructed the hash of each adjacent node at the same level may be hashed together to create a new node that exists at a higher level in the tree. Therefore, the root of the tree, or the node at the top of the tree, is dependent upon the hash of each transaction stored below in the tree. Each transaction 508 may include a set of data 510. The set of data 510 may include identifying data for the transaction, and transaction data identifying the nature of the transaction and what the transactions entails.

Figure 6:
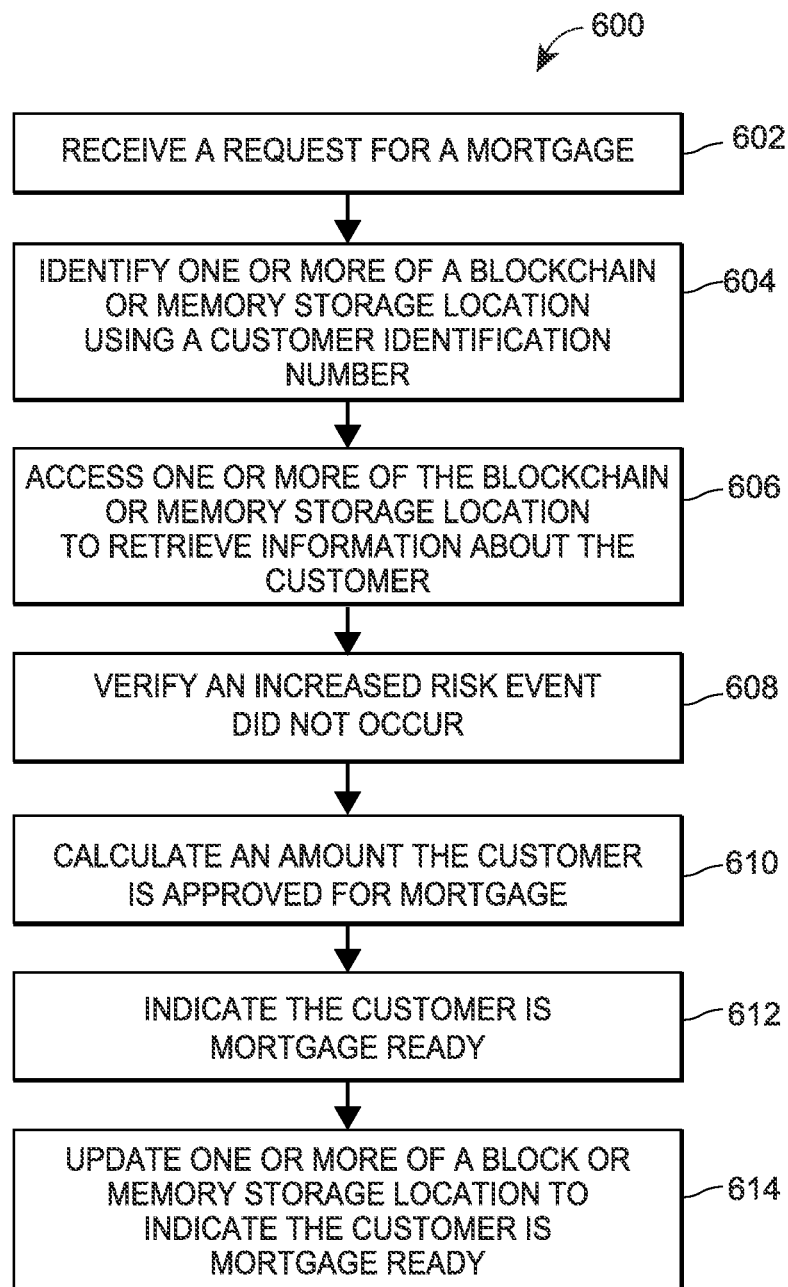
FIG. 6 depicts an exemplary computer-implemented method of utilizing blockchain technology to determine a customer is approved for a mortgage.

Exemplary Methods of Using a Blockchain to Approve a Dynamic Mortgage Application FIG. 6 depicts an exemplary computer-implemented method 600 for using a blockchain to determine a customer is approved for a mortgage associated with one aspect of the present disclosure. The customer may be one or more customers 12-1 through 12-N, as depicted in FIG. 1. Each customer may correspond to a respective customer identification number or record tracked by a blockchain that is maintained by one or more participants. In some examples, the one or more participants may be one or more of the nodes 212, 214, 216 described above and depicted in FIG. 3A, for example. In addition, the blockchain may be the blockchain 222 of the blockchain system 200 of FIG. 1 and/or the blockchain 500 of FIG. 5. The steps of the flow diagram may be performed by the nodes, such as the nodes depicted in FIG. 3A. The method 600 may include additional, fewer, or alternative actions, including those described elsewhere herein.

More specifically, and in one example, the method 600 may include receiving, at one or more processors, such as the one or more processors of the insurance entity 14, a request for a mortgage associated with a customer identification number (block 602). Said another way, the one or more processors may receive a request from a customer for a mortgage, and the customer is associated with a customer identification number. The method may further include identifying, via the one or more processors of the insurance entity, one or more of a blockchain or a memory storage location associated with the customer. The customer's blockchain or the customer's mortgage storage location may be identified using the customer identification number (block 604), for example.

The method further includes accessing, at a memory coupled to the one or more processors, one or more of the blockchain or the memory storage location corresponding to the customer identification number to retrieve information about the customer (block 606). The information about the customer may include one or more of customer age, marital status, homeowner status, income level, occupation, finances or income, insurance status, education level, employment status, telematics data, credit score data, deposit account data for down payment, and current payment stub data. According to some aspects, accessing one or more of the blockchain or the memory storage location may include verifying, at the one or more processors, a notification source for the request for the mortgagee; identifying, at the one or more processors, one or more entries in one or more of the blockchain or memory storage location corresponding to the customer identification number or record for the customer; and accessing, at the memory, the one or more entries in one or more of the blockchain or memory storage location corresponding to the customer identification number records for the customer. According to still other aspects, the blockchain system 200 may include one or more of the blockchain system of the insurance entity 14 or the blockchain 500 depicted in FIG. 5.

The method may further include verifying, at the one or more processors, no increased risk event occurred (block 608). The increased risk event may include one or more of a decrease in the deposit account data for down payment, a declaration of bankruptcy, a decrease in credit score, an unemployment claim, or old or dated pay stub data. In some examples, old or dated pay stub data may include a pay stub more than two weeks old or more than one month old.

The method then may also include calculating, at the one or more processors, an amount the customer is approved for a mortgage loan based upon the retrieved information about the customer (block 610). In one example, the one or more processors calculate the amount using one or more of an algorithm or a set of rules based upon at least one or more of the information about the customer listed above. In addition, the method may further include indicating, at the one or more processors, the customer is mortgage ready (block 612), which reduces the processing time for approving a mortgage application of the customer, as explained more below. Further, the method may further include updating, at the memory, one or more of a block for the blockchain or the memory storage location to indicate the customer is mortgage ready (block 614). Still further, in yet still other aspects, the method may further include transmitting, via the one or more processors coupled with the network interface, the block to another participant in the blockchain.

In some aspects, the method 600 may further include monitoring, via the one or more processors, the retrieved information about the customer from one or more of the blockchain or the memory storage location in real time, such as via machine learning (such as supervised or unsupervised machine learning) or artificial intelligence algorithms. For example, machine learning may be utilized to identify increased risk events across a pool of mortgage customers. Accordingly, the one or more processors may monitor a plurality of mortgage transactions recorded in the blockchain or the memory storage location to develop and/or train the machine learning algorithms associated with customer mortgage risk. To this end, upon the completion of the mortgage, the machine learning algorithms may be adjusted based upon the mortgage outcomes and/or the retrieved information about the customer. That is, if a mortgage successfully is completed without any delays, the machine learning algorithms that detect increased risk events may decrease weights associated with characteristics of the customer.

In one embodiment, machine learning techniques may also be used to determine whether information associated with the consumer indicates that the consumer is mortgage ready. To this end, the machine learning algorithms may develop and update weights for different types of customer information, such as customer age, marital status, homeowner status, income level, occupation, finances or income, insurance status, education level, employment status, telematics data, credit score data, deposit account data for down payment, and current payment stub data. Based upon an analysis of the various weights, the machine learning algorithms may determine that the customer is mortgage ready.

In another embodiment, machine learning techniques may also be used to predict the likelihood of a delay in the mortgage process and/or other negative outcomes. For instance, rather than detecting whether an increased risk event has occurred, the machine learning techniques may analyze the retrieved customer information to determine an overall customer risk profile. In some scenarios, the overall risk may be determined based upon a plurality of sub-models that analyze individual aspects of mortgage risk. In this embodiment, an "increased risk event" may be the machine learning algorithm that assesses an overall customer risk profile determining that the risk for the current customer exceeds a threshold value.

The method may still further include updating, via the one or more processors and according to an interval of time, the amount in which the customer is approved for a mortgage loan based upon any changes in the information about the customer being monitored. The interval of time may include one or more of real time, daily, every two weeks, monthly, every six months and yearly.

Alternatively, and/or additionally, the method may further include receiving, via the one or more processors, updated information about the customer. The updated information may include one or more of customer age, marital status, homeowner status, income level, occupation, finances or income, insurance status, education level, employment status, telematics data, credit score data, deposit account data for down payment, and current payment stub data. In this example, the method may then further include updating, at the memory, one or more of a block for the blockchain or the memory storage location to include and/or indicate the updated information about the customer received again according to an interval of time. The interval of time may include one or more of real time, daily, bi-weekly, bi-monthly, monthly, bi-annually or annually. The updated blocks may then be transmitted, via one or more of the processors, to other nodes in a communication network, for example.

Figure 7:
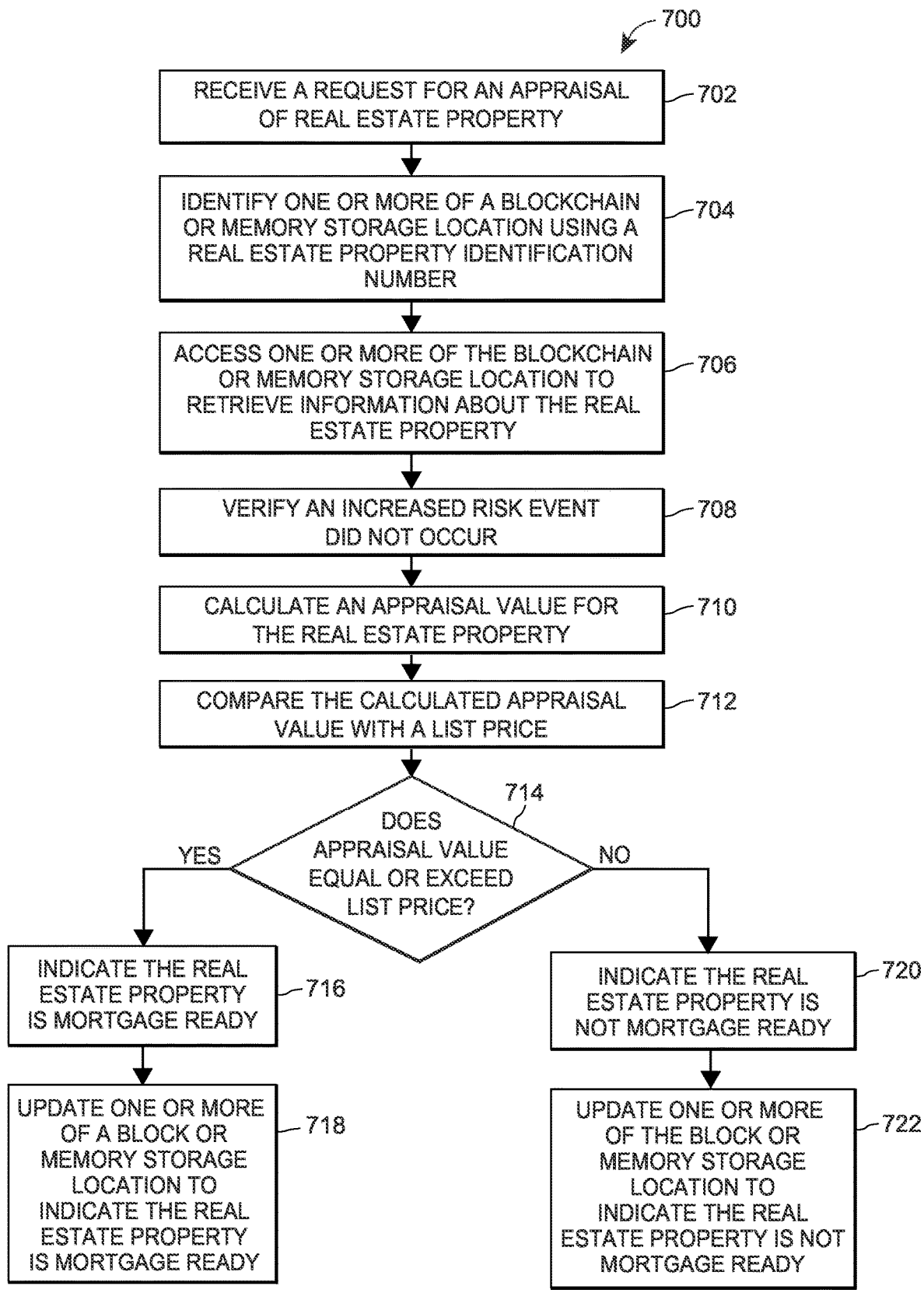
FIG. 7 depicts an exemplary computer-implemented method of utilizing blockchain technology to determine a real estate property is mortgage ready.

Referring now to FIG. 7, an exemplary computer-implemented method 700 for using one or more of a blockchain or a memory storage location to determine a real estate property is mortgage ready is depicted. Each real estate property may correspond to one or more of a respective real estate property identification number (PIN) (such as a tax identification number), a multiple listing service (MLS) number or record, or street address or other record or identifier tracked by a blockchain that is maintained by one or more participants. In some examples, the one or more participants may be one or more of the nodes 212, 214, 216 described above and depicted in FIG. 3A, for example. In addition, the blockchain may be the blockchain 222 of the blockchain system 200 of FIG. 1 and/or the blockchain 500 of FIG. 5. The steps of the flow diagram may be performed by the nodes, such as the nodes depicted in FIG. 3A. The method 700 may include additional, fewer, or alternative actions, including those described elsewhere herein.

As depicted in FIG. 7, the method may include receiving, at one or more processors, a request for an appraisal associated with one or more of a real estate property identification number (PIN) and/or a multiple listing service (MLS) number (block 702). In addition, the method may include identifying, via the one or more processors, one or more of a blockchain or a memory storage location associated with the real estate property (block 704). In one example, the real estate property's blockchain or memory storage location may be identified using the PIN and/or MLS number. Further, the method may include accessing, at a memory coupled to the one or more processors, one or more of the blockchain or the memory storage location corresponding to the PIN and/or MLS number to retrieve information about the real estate property (block 706). In some examples, the information includes one or more of list price, real estate property list price age, historical appraisal data, age of roof, age of siding, age of driveway, age of one or more appliances, basement remodel data, square footage data, number of bathrooms, number of bedrooms, flood or water damage data, neighborhood crime score, proximity to public transportation, proximity to airport, proximity to major metropolitan area, proximity to recreation, school district data, fire or flood claims in neighborhood, building materials data for new construction, street address or other location data, and repairs data.

In addition, the method may include verifying, via the one or more processors, no increased risk event occurred (block 708) or an increased risk event did not occur. The increased risk event may include one or more of an indication a claim for damages was filed or the property is in one or more of a hurricane zone, a flood zone, or an earthquake zone. The method may further include calculating, via the one or more processors, an appraisal value for the real estate property based upon the retrieved information about the real estate property from the blockchain (block 710). In one example, the one or more processors calculates the amount using an algorithm or one or more sets of rules based upon the real estate property information described above.

Still further, the method may include comparing, via the one or more processors, the calculated appraisal value with the list price accessed from one or more of the blockchain or the memory storage location corresponding to the PIN and/or MLS number (block 712). More specifically, the one or more processors determines if the calculated appraisal value is equal to, or exceeds, the list price (accessed from the blockchain, for example) (block 714). If yes, the one or more processors further indicate that the real estate property is mortgage ready (block 716). In some aspects, the method may further include updating, at the memory, one or more of a block for the blockchain or the memory storage location to indicate the real estate property is mortgage ready (block 718). However, if the one or more processors determine the calculated appraisal value does not equal, or exceed, the list price, then the one or more processors may indicate the real estate property is not mortgage ready (block 720). In some aspects, the one or more processors may then further update, at the memory, the block or the memory storage location to indicate the real estate property is not mortgage ready (block 722).

Similar to the method for using one or more of a blockchain or a memory storage location to determine a customer is approved for a mortgage associated described above, in some aspects the method 700 may further include monitoring, via the one or more processors, the retrieved information about the real estate property from one or more of the blockchain or the memory storage location in real time, such as via machine learning or artificial intelligence algorithms. According to certain aspects, the machine learning algorithms associated with the method 700 may be implemented in a similar manner as described with respect to the method 600 above. To this end, machine learning techniques may be utilized to identify increased risk events based upon characteristics of properties across a pool of properties and/or develop an overall property risk profile.

In one embodiment, machine learning techniques, including supervised or unsupervised machine learning, may also be used to determine whether information associated with the real estate property indicates that the real estate property is mortgage ready. To this end, the machine learning algorithms may develop and update weights for different types of real estate property information, such as real estate property list price, age, historical appraisal data, age of roof, age of siding, age of driveway, age of appliances, basement remodel data, square footage data, number of bedrooms, number of bathrooms, flood or water damage data, neighborhood crime score, proximity to public transportation, proximity to airport, proximity to major metropolitan area, proximity to recreation, school district data, fire or flood claims in neighborhood, building materials data for new construction, and/or repairs data. Based upon an analysis of the various weights, the machine learning algorithms may determine that the real estate property is mortgage ready.

In other aspects, the method 700 may include updating, at the memory and according to an interval of time, the appraisal value based upon any changes in the information about the real estate property being monitored. The interval of time may include one or more of real time, daily, every two weeks, monthly, every six months and yearly.

Still further, the method 700 may also include receiving, via the one or more processors, updated or new information about the real estate property. The updated or new information may include one or more of real estate property list price, age, historical appraisal data, age of roof, age of siding, age of driveway, age of appliances, basement remodel data, square footage data, number of bedrooms, number of bathrooms, flood or water damage data, neighborhood crime score, proximity to public transportation, proximity to airport, proximity to major metropolitan area, proximity to recreation, school district data, fire or flood claims in neighborhood, building materials data for new construction, and/or repairs data. Still further, the method 700 may include then updating, at the memory, one or more of a block for the blockchain or the memory storage location to include the new information about one or more of the real estate property or the updated appraisal value according to an interval of time. The interval of time may again include one or more of real time, daily, every two weeks, monthly, every six months and yearly. Still further, the method 700 may include transmitting, via one or more of the processors, the updated blockchain to other nodes in a communication network.

Figure 8:
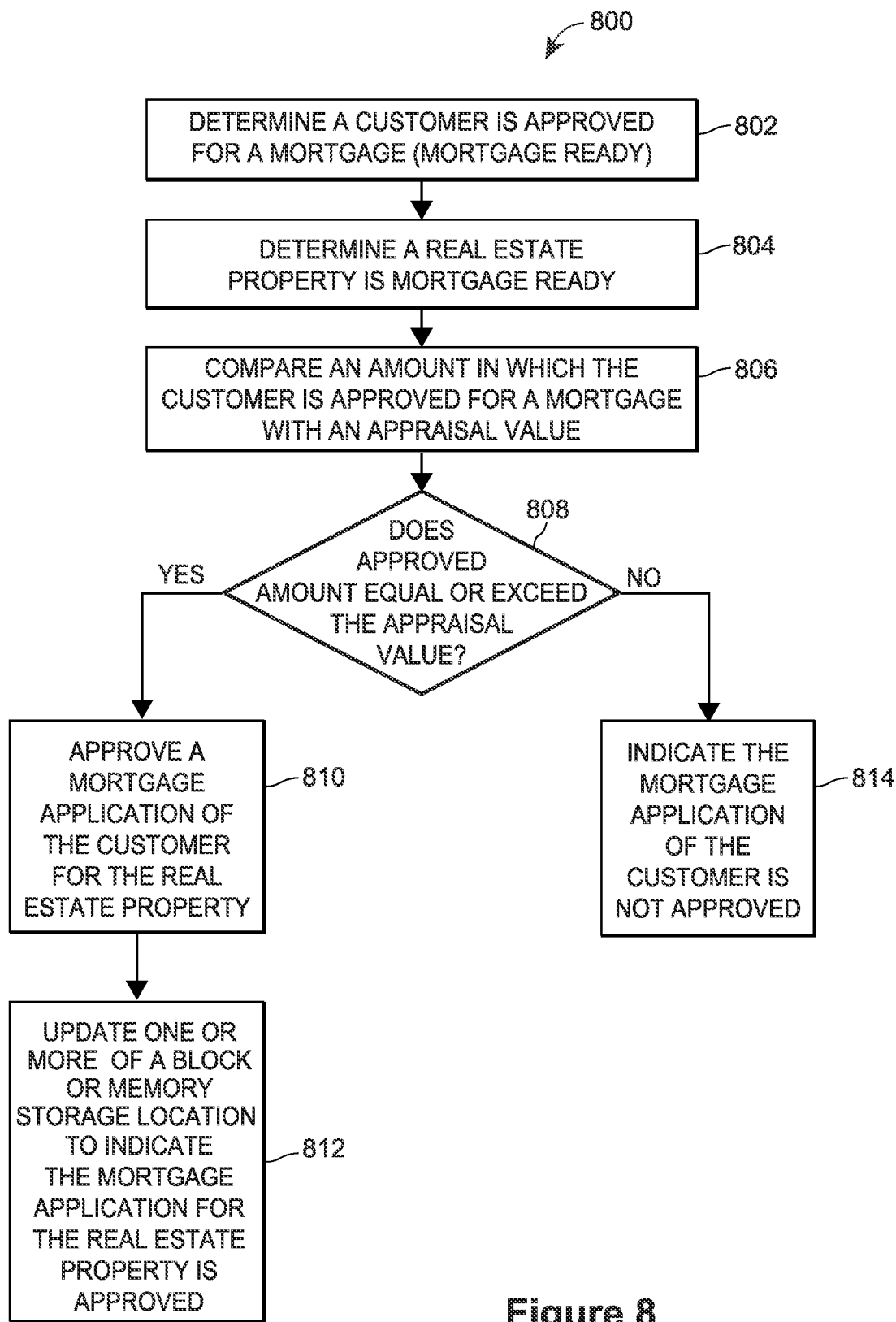
FIG. 8 depicts an exemplary computer-implemented method of using a blockchain to approve a dynamic mortgage application.

Referring now to FIG. 8, a computer-implemented method 800 of approving a dynamic mortgage application using one or more of a blockchain or a memory storage location is depicted. The blockchain may be the blockchain 222 of the blockchain system 200 of FIG. 1 and/or the blockchain 500 of FIG. 5. The steps of the flow diagram may be performed by the nodes, such as the nodes depicted in FIG. 3A. The method 800 may include additional, fewer, or alternative actions, including those described elsewhere herein.

The method 800 may include determining, via one or more processors, such as one or more processors of the insurance entity 14, for example, a customer is approved for a mortgage (block 802). Determining a customer is approved for a mortgage or mortgage ready may include at least part of the method 600 depicted in FIG. 6 and described above. More generally, determining the customer is approved for a mortgage or mortgage ready may include identifying and accessing one or more of a blockchain or a memory storage location using a customer identification number to retrieve information about the customer and relative to an approval of a mortgage (see, e.g., blocks 606 and 608 of FIG. 6).

The method 800 may further include determining, again via the one or more processors, a real estate property is mortgage ready (block 804). Determining a real estate property is mortgage ready may include at least part of the method 700 depicted in FIG. 7 and described above. More generally, determining the real estate property is mortgage ready may include identifying one or more of a blockchain or memory storage location using a real estate property identification number and accessing one or more of the blockchain or the memory storage location to retrieve information about the real estate property (e.g., blocks 704, 706 of FIG. 7). The method 700 may also include calculating an appraisal value of the real estate property based upon the information about the real estate property accessed from the blockchain, comparing the calculated appraisal value for the real estate property with a list price of the real estate property accessed from the blockchain, and indicating the real estate property is mortgage ready when the appraisal value is equal to, or exceeds, the list price (see, e.g., blocks 710, 712 and 716 of FIG. 7).

After it is determined the customer is approved for a mortgage and the real estate property is mortgage ready, the method 800 may further include comparing, via the one or more processors, such as the one or more processors of the insurance entity 14, a calculated amount the customer is approved for a mortgage with the calculated appraisal value of the real estate property (block 806). More specifically, the one or more processors determine if the amount the customer is approved for a mortgage is equal to, or exceeds, the calculated appraisal value of the real estate property (block 808). If yes, the one or more processors approve a mortgage application of the customer for the requested real estate property that is mortgage ready (block 810). The method may then further include updating, at the memory, one or more of a block for the blockchain or the memory storage location to indicate the customer mortgage application for the requested real estate property is approved (block 812).

However, if the amount the customer is approved for a mortgage does not equal, or exceed, the calculated appraisal value of the real estate property, the one or more processors may indicate the mortgage application of the customer for the requested real estate property is not approved (block 814). In one example, the method may further include updating, at the memory, a block for the blockchain to indicate the customer mortgage application for the requested property is not approved.

In some aspects, the method 800 of FIG. 8 may further include identifying, via the one or more processors, a county blockchain associated with the real estate property requested or of interest, such as the blockchain system 21 of the computing system 20 of the county entity in FIG. 1. In this example, the county blockchain may be identified using the PIN and/or MLS number and accessed, at a memory coupled to the one or more processors, corresponding to the PIN and/or MLS number to retrieve information about the real estate property. Such information may include one or more of proof of a title search or proof of lien free title.

In other aspects, the method 800 may further include offering, via the one or more processors, a quote for one or more of homeowner's insurance and mortgage insurance for the requested real estate property based upon the calculated appraisal value. Said another way, the method 800 may include generating, via the one or more processors, one or more of a homeowner's insurance quote or a mortgage insurance quote for the requested real estate property based upon the appraisal value, which was calculated from information accessed in the blockchain. The method 800 may still further include monitoring, via the one or more processors, one or more of the retrieved information about the customer from the blockchain or the retrieved information about the real estate property from the blockchain according to an interval of time, such as real time.

The method 800 may also include updating, at the memory, one or more of a block or the blockchain or a memory storage location to include any new information about the customer or any new information about the real estate property identified while monitoring the information. The method 800 may still further include updating, at the memory, the blockchain to include and/or indicate one or more of the calculated amount the customer is approved for a mortgage, the calculated appraisal value of the real estate property requested, or a status of the one or more of the customer or the real estate property as mortgage ready.

In view of the foregoing, one of ordinary skill in the art will at least appreciate the following advantages of one or more of the systems and methods 600, 700, 800. For example, the foregoing methods 600, 700, 800 enable a mortgage to be processed at least within three to seven days, a considerably shorter period of time than the traditional 30 days or more for conventional mortgages. In addition, because the information relative to customers determined to be mortgage ready and the real estate properties determined to be mortgage ready is continuously updated, the customer may decide at any point that he or she is ready to complete a mortgage application for a particular real estate property, for example, and the work needed for the customer to be approved for the mortgage is already done and updated, or already substantially done.

Moreover, by using one or more of a private, internal blockchain of the insurance entity 14 (FIG. 1) or a memory storage location, the insurance entity 14, such as an insurance provider, is able to market its products as having mortgage ready advantages. Said another way, for customers already having insurance products, such as one or more of homeowner's insurance, life insurance, renter's insurance, or auto insurance with the insurance entity 14, such customers may enjoy benefits of having information relative to both the customer and/or the real estate property being continuously updated to the blockchain. As a result, the insurance entity 14, for example, is able to provide mortgage ready status for one or more of the customer or the real estate property, which may enable the customer to close a property within three days. For example, this mortgage ready status may enable the customer to buy a real estate property, e.g., a house, and sell their real estate property insured by the insurance entity 14, for example, at a significantly faster rate than using another vendor or conventional methods.

Further, by using the blockchain, such an internal blockchain system 200 of the insurance entity 14, for at least the methods 600-800 described above, it is simpler and easier for customers desiring to be preapproved for a mortgage and/or approved for a mortgage application for a real estate property to provide information for the same. This is at least because such information is pre-populated and/or included and/or accessible on the blockchain. Said another way, there is low customer effort and a high degree of automation for customers desiring to be approved for a mortgage using the blockchain of the insurance entity 14, for example. Because the blockchain essentially includes a digital identity for each of the customer and the real estate properties, as described above, and the digital identity, e.g., information about each of the customer and real estate property, is continuously updated with accurate information, there is a significantly faster mortgage and appraisal process than conventional processes. This also allows the customer to be approved for a mortgage application directed to a particular real estate property, for example, at a significantly reduced period of time than conventional time periods for mortgage applications, revolutionizing conventional mortgage processes.

Moreover, if the customer's current real estate property, which the customer desired to sell, is insured by the insurance entity 14 using the blockchain for information about the real estate property, for example, the customer can market the real estate property as capable of being sold, e.g., closed, within 3 to 7 days. This is an extremely desirable period of time for many entities, including, but not limited to, the real estate property buyer, the lender or bank entity, and the insurance entity, such as the insurance provider.

Still further, the information about the real estate properties collected and updated to the blockchain is significantly more detailed and accurate compared to information about real estate properties currently existing in the mortgage industry. As a result, more accurate real estate transactions and insurance offers for the real estate properties, for example, can occur.

As one of ordinary skill in the art will further appreciate, many of the foregoing advantages, in whole or part, are also provided by the following other exemplary methods of the present disclosure.

Exemplary Methods of Continuously Monitoring and Updating Mortgage Ready Data

Figure 9:
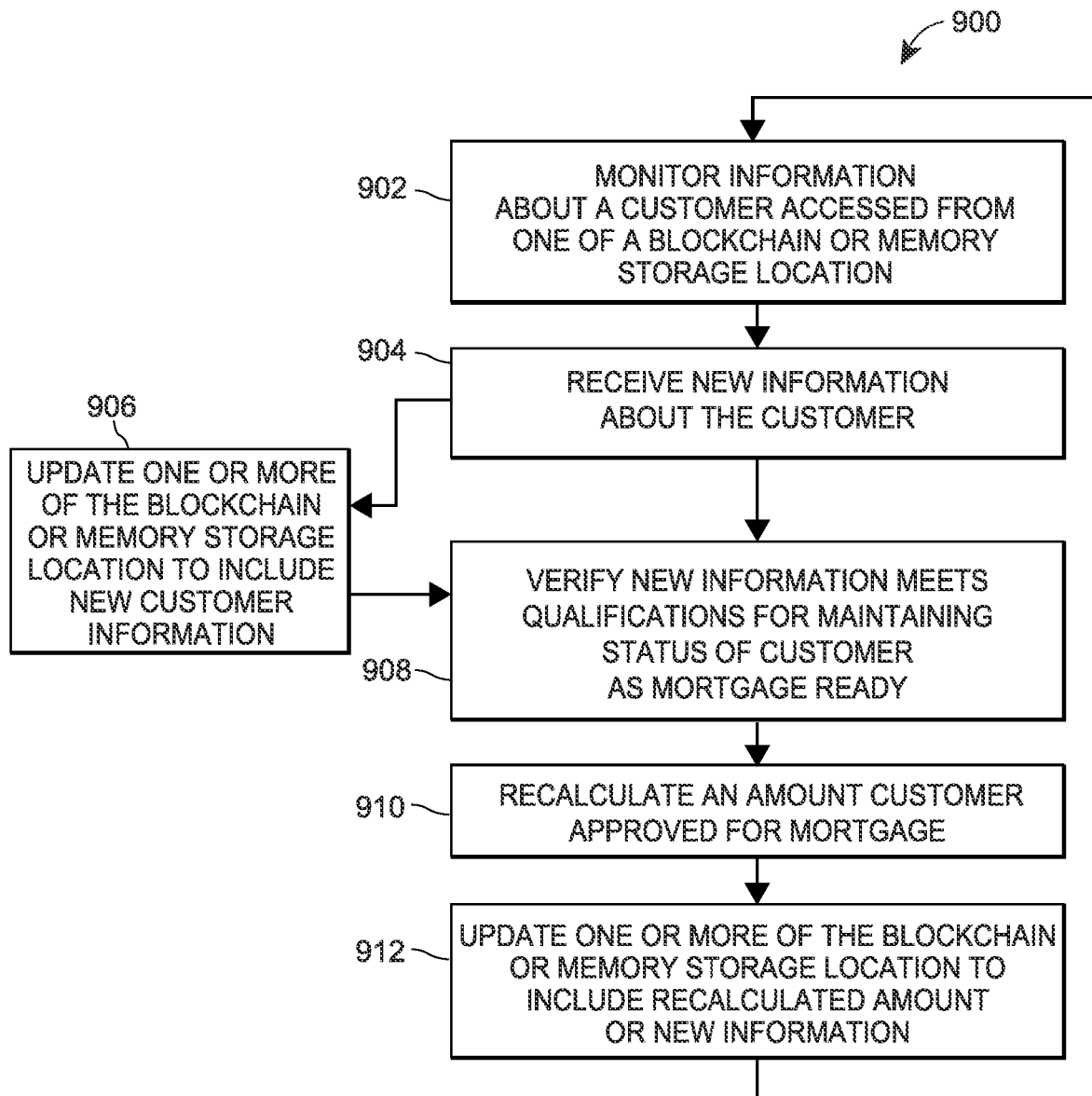
FIG. 9 depicts an exemplary computer-implemented method of continuously updating information about a customer approved for a mortgage.

Referring now to FIG. 9, a computer-implemented method 900 of using one or more of a blockchain or a memory storage location to continuously monitor and update information about a customer approved for a mortgage, such as a mortgage ready customer, is depicted. The method 900 may include monitoring, via the one or more processors, information about the customer accessed from one or more of the blockchain or the memory storage location corresponding to an identification number of the customer, such as the customer identification number (block 902). The information about the customer is information used to determine a customer is approved for a mortgage and includes one or more of customer age, marital status, homeowner status, income level, occupation, finances or income, insurance status, education level, employment status, telematics data, credit score data, deposit account data for down payment, and current pay stub data and the like.

The method 900 may further include receiving, via the one or more processors, new information, such as new information accessed from one or more of the blockchain or the memory storage location, about the customer (block 904). The new information is used to determine the customer is approved for a mortgage and includes one or more of customer age, marital status, homeowner status, income level, occupation, finances or income, insurance status, education level, employment status, telematics data, credit score data, deposit account data for down payment, and current pay stub data, for example. In some aspects, the one or more processors may then update, at the memory, the blockchain or the memory storage location to include the new information about the customer (block 906).

The method 900 may further include verifying, via the one or more processors, the new information continues to meet minimum qualifications for maintaining the status of the customer as approved for the mortgage, e.g., maintaining the status of the customer as mortgage ready (block 908). In one example, the method may further include validating, via the one or more processors, the status of the customer as approved for the mortgage when the new information meets the minimum qualifications. The minimum qualifications include maintaining a predetermined level or amount of money in a designated deposit account for a down payment on the real estate property and providing an updated pay stub one of every two week period of time, bi-monthly, or monthly indicating the employment status is employed.

In addition, the method 900 may further include recalculating, via the one or more processors, an amount the customer is approved for a mortgage based upon the new information received, such as new information accessed from the blockchain (block 910). The method may then further include updating, at the memory, one or more of the blockchain or the memory storage location to include the recalculated amount the customer is approved for the mortgage (block 912). After one or more of the blockchain or the memory storage location is updated (block 912), the one or more processors continue to monitor the information about the customer accessed from one or more of the blockchain (block 902) or the memory storage location. In some aspects, the method 900 may further include transmitting, via the one or more processors, the updated blockchain information to other nodes in a communication network.

Figure 10:
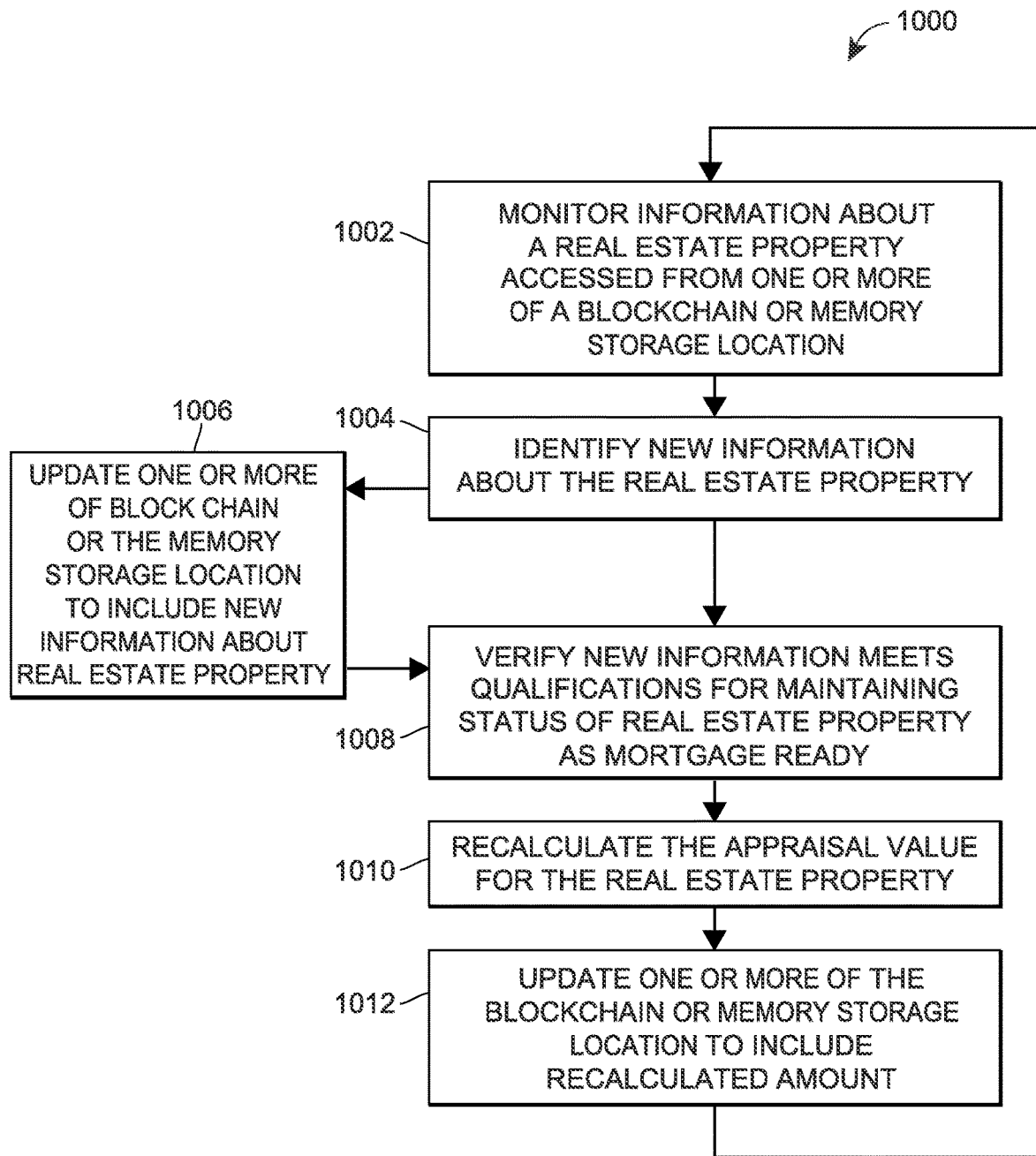
FIG. 10 depicts an exemplary computer-implemented method of continuously updating information about a real estate property identified as mortgage ready.

Referring now to FIG. 10, a computer-implemented method 1000 of using one or more of a blockchain or a memory storage location to continuously update information about a real estate property identified as mortgage ready is depicted. The real estate property may be associated with one or more of a real estate property identification number (PIN) and/or a multiple listing service (MLS) number, for example. The method 1000 may include monitoring, via the one or more processors, information corresponding to the PIN and/or MLS number accessed from one or more of the blockchain (block 1002) or the memory storage location. The information is the information used to determine if the real estate property is mortgage ready and includes one or more of real estate property age, historical appraisal data, age of roof, age of siding, age of driveway, age of appliances, basement remodel data, square footage data, number of bathrooms, number of bedrooms, flood or water damage data, neighborhood crime score, proximity to public transportation, proximity to the airport, proximity to major metropolitan area, proximity to recreation, school district data, fire or flood claims in the neighborhood, building materials data for new construction, and/or repairs data.

The method 1000 may further include identifying, via the one or more processors, new information about the real estate property, such as new information accessed from one or more of the blockchain (block 1004) or the memory storage location. The new information includes any of the foregoing information used to determine the real estate property is mortgage ready listed above. The method 1000 may further include updating, at the memory, one or more of a block for the blockchain or the memory storage location, to include the new information about the real estate property (block 1006).

The method 1000 may still further include verifying, via the one or more processors, that the information continues to meet minimum qualifications for maintaining the status of the real estate property as mortgage ready (block 1008). In some aspects, the minimum qualifications for maintaining the status of the real estate property as mortgage ready include having a title free of any liens and having an absence of any insurance claims exceeding a predetermined threshold. The predetermined threshold may include one of $2000, $5000, $10,000 or other threshold determined by an entity, such as the insurance entity 14, as critical to maintaining the status as mortgage ready. The minimum qualifications may further include maintaining the status of the real estate property in one or more of a no flood zone, a no hurricane zone, or a no earthquake zone.

The method 1000 may also include recalculating, via the one or more processors, the appraisal value for the real estate property based upon one or more of the new information received or the updated information from the blockchain (block 1010). In some aspects, the method 1000 may further include updating, at the memory, one or more of a block for the blockchain or the memory storage location to include the recalculated amount (block 1012).

In still further aspects, the method 1000 may include comparing, via the one or more processors, the recalculated appraisal value with a list price accessed from one or more of the blockchain or the memory storage location according to an interval of time, such as real time, as defined above. In addition, the method 1000 may still further include indicating, via the one or more processors, the real estate property is mortgage ready when the recalculated appraisal value meets, or exceeds, the list price. In a similar manner, the method 1000 may still further include indicating, via the one or more processors, the real estate property is not mortgage ready when the recalculated appraisal value is below the list price.

Figure 11:
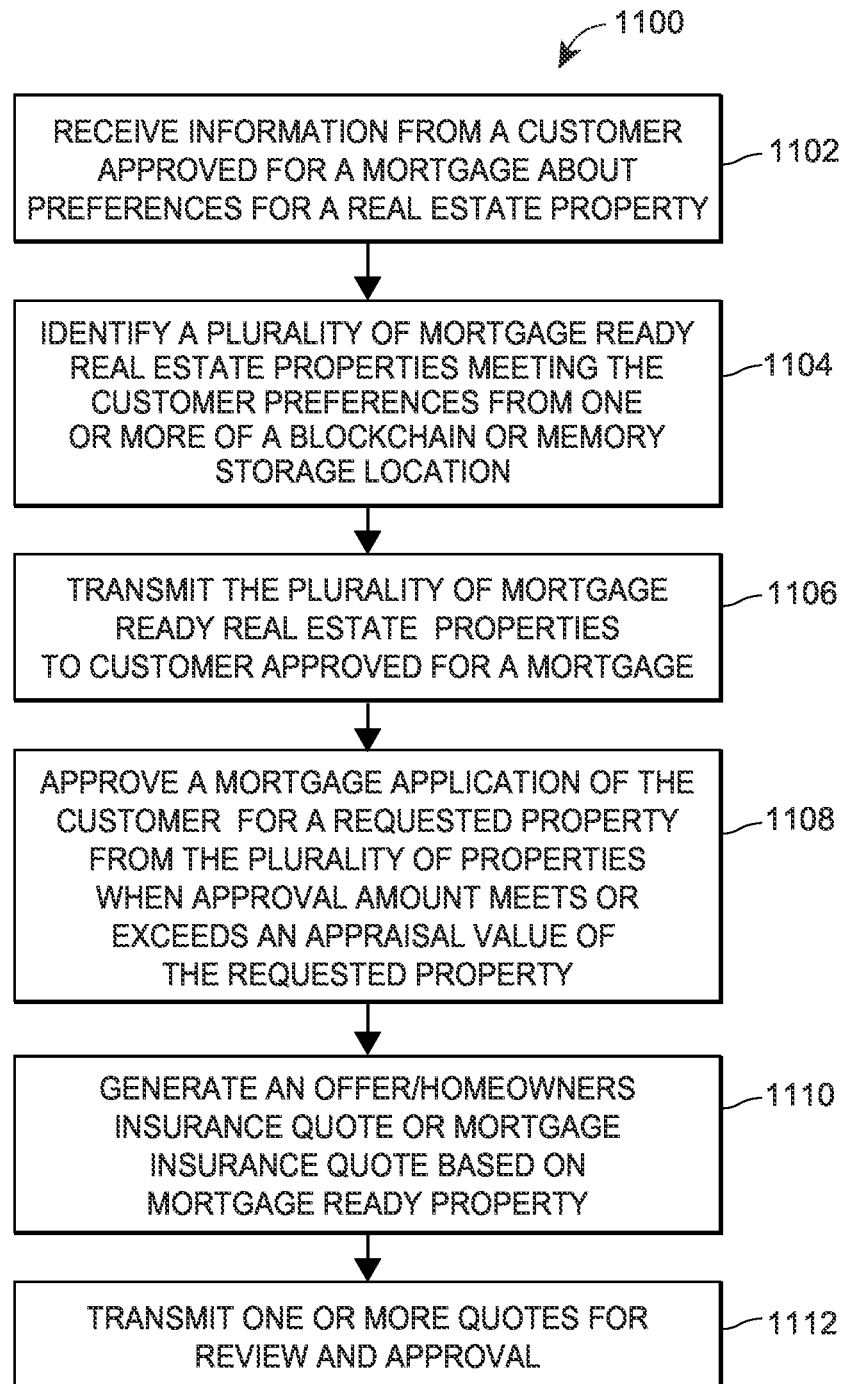
FIG. 11 depicts an exemplary computer-implemented method of utilizing blockchain technology to identify multiple mortgage ready properties based upon customer input.

Exemplary Methods of Identifying Multiple Mortgage Ready Properties Based Upon Customer Input Referring now to FIG. 11, a computer-implemented method 1100 of identifying multiple mortgage ready properties using one or more of a blockchain or memory storage location is depicted. As in previous aspects of the present disclosure, each mortgage ready property is associated with a real estate property identification number (PIN) and/or a multiple listing service (MLS) number. According to some aspects, the method may include receiving, via one or more processors, information from a customer approved for a mortgage about preferences for a real estate property (block 1102). In some examples, the information includes customer preferences for one or more of real estate property list price, age, historical appraisal data, age of roof, age of siding, age of driveway, age of appliances, basement remodel data, square footage data, number of bathrooms, number of bedrooms, flood or water damage, neighborhood crime score, proximity to public transportation, proximity to airport, proximity to major metropolitan area, proximity to recreation, school district data, fire or flood claims in neighborhood, building materials for new construction, repairs data, and price range.

The method 1100 may further include identifying, via one or more processors, from one or more of a blockchain or a memory storage location a plurality of mortgage ready real estate properties meeting at least one or one or more of the customer preferences information received by the customer (block 1104). In addition, the method may further include transmitting, via the one or more processors, the plurality of real estate properties meeting the customer preferences information to the customer (block 1106) approved for a mortgage. In yet other examples, the method 1100 may include verifying, via the one or more processors, from one or more of a blockchain or the memory storage location associated with the customer that the customer associated with the real estate property preference information is approved for a mortgage and accessing, at a memory, an amount in which the customer is approved for the mortgage.

The method 1100 may further include receiving, via the one or more processors, a request from the customer for a mortgage loan for one of the real estate properties meeting the customer preferences information. In addition, the method 1100 may further include comparing, via the one or more processors, the amount in which the customer is approved for a mortgage loan with an appraisal value of the requested real estate property accessed from one or more of the blockchain or the memory storage location. In some examples, the method 1100 may further comprise calculating, via the one or more processors, a required down payment amount based upon the appraisal value of the requested real estate property, for example. In addition, the method may comprise comparing, via the one or more processors, the required down payment amount with a deposit account value of the customer accessed from one or more of the memory storage location or the blockchain.

The method 1100 may further include approving, via the one or more processors, a mortgage application of the customer for the requested real estate property when the amount the customer is approved for the mortgage loan exceeds the appraisal value of a property selected from the plurality of mortgage ready properties identified as meeting one or more of the customer's preferences (block 1108). In some examples, approving, via the one or more processors, the mortgage application of the customer for the requested mortgage ready real estate property includes indicating, via the one or more processors, a deposit account value of the customer (accessed from one or more of the memory storage location or blockchain) meets, or exceeds, the down payment amount for the requested real estate property.

The method 1100 may still further include generating, via the one or more processors, an offer for homeowner's insurance quote or mortgage insurance quote based upon the identified mortgage ready property (block 1110). Still further, the method 1100 may include transmitting, via the one or more processors, one or more quotes to the customer providing the preferences about the real estate properties for review and approval (block 1112).

In other aspects, the method 1100 may include updating, via the one or more processors, at least one real estate property from the plurality of real estate properties meeting the customer preferences information according to an interval of time, such as in real time.

Figure 12:
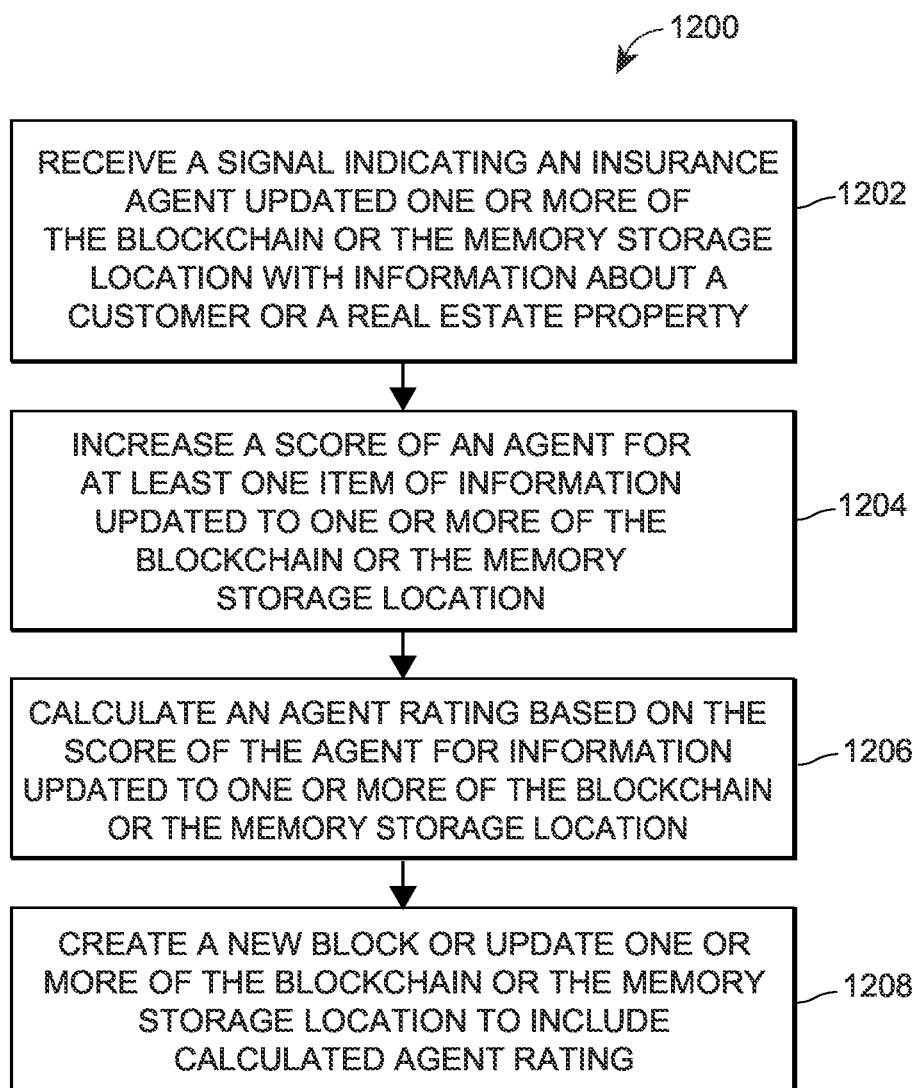
FIG. 12 depicts an exemplary computer-implemented method of incentivizing an agent to update a blockchain.

Exemplary Method of Incentivizing/Rating Agents Based Upon Mortgage Ready Customer and Real Estate Property Information Referring now to FIG. 12, a computer-implemented method 1200 of incentivizing an insurance agent to update one or more of a blockchain or a memory storage location is depicted. The method 1200 may include receiving, via one or more processors, one or more of a message or a signal indicating an agent updated one or more of a blockchain or a memory storage location with mortgage ready information about the customer or the real estate property (block 1202). The method may further include increasing, via the one or more processors and according to an interval of time, a score of the agent for at least one item of information about one or more of the customer or the real estate property that was updated to one or more of the blockchain (block 1204) or memory storage location. The interval of time may include one or more of real time, daily, bi-weekly, monthly, quarterly, bi-yearly, or annually. The method 1200 may further include calculating, via the one or more processors, an agent rating based upon the score of the agent (block 1206). In one example, the agent rating for updating information about the customer or the real estate property may include one of excellent, very good, average, below average, and poor. The agent rating may be used to compute one or more of compensation or bonus of the agent, for example. The method 1200 may still further include updating, at the memory, one or more of the blockchain or memory storage location, such as by creating a new block to include the calculated insurance agent rating relative to an identified insurance agent (block 1208).

According to some aspects, receiving a message indicating an agent updated one or more of a blockchain or memory storage location with information about the customer includes receiving information about the customer that includes one or more of customer age, marital status, homeowner status, income level, occupation, finances or income, insurance status, education level, employment status, telematics data, credit score data, deposit account data for down payment, and current payment stub data. In addition, increasing a score of the agent for at least one item of information about the customer may include increasing the score of the agent for each item of information about the customer updated to one or more of the blockchain or the memory storage location corresponding to the customer.

According to still other aspects, receiving a message indicating an agent updated one or more of a blockchain or a memory storage location with information about the real estate property may include receiving information about the real estate property that includes one or more of real estate property age, historical appraisal data, age of roof, age of siding, age of driveway, age of one or more appliances, basement remodel data, square footage data, number of bathrooms and/or bedrooms, flood or water damage data, neighborhood crime score, proximity to public transportation, proximity to airport, proximity to major metropolitan area, proximity to recreation, school district data, fire or flood claims in neighborhood, building materials data for new construction, or repairs data. In addition, increasing a score of the agent for at least one item of information updated to one or more of the blockchain or the memory storage location may include increasing the score of the agent for each item of information about one or more of the real estate property or the customer updated to the blockchain.

Additional "Mortgage Ready" Embodiments

Some of the present embodiments employ blockchain technology. Other embodiments of the present disclosure may not employ blockchain technologies or techniques, but employ other computer/computing technologies. For instance, machine learning algorithms or artificial intelligence techniques may, or may not, be utilized.

In one aspect, a computer-implemented method of determining a customer is approved for a mortgage (or mortgage ready) may be provided. The method may include (1) receiving, at one or more processors, a request for a mortgage associated with a customer identification number; (2) identifying, via the one or more processors, a computer or memory file, or memory storage location (or computer folder, or memory location) associated with the customer, the customer's computer file or memory storage location may be identified using the customer identification number; (3) accessing, at a memory coupled to the one or more processors, the computer file or memory storage location corresponding to the customer identification number to retrieve information about the customer, the information including one or more of customer age, marital status, homeowner status, income level, occupation, finances or income, insurance status, education level, employment status, telematics data, credit score data, deposit account data for down payment, and current payment stub data; (4) verifying, via the one or more processors, no increased risk event occurred, the increased risk event including one or more of a decrease in the deposit account data for down payment, a declaration of bankruptcy, a decrease in credit score, an unemployment claim, or old or expired pay stub data; and/or (5) calculating, via the one or more processors, an amount the customer is approved for a mortgage loan based upon the retrieved information about the customer and indicating, via the one or more processors, the customer is mortgage ready, reducing the processing time for a mortgage approval. The method may include additional, less, or alternate actions, including that discussed elsewhere herein.

In another aspect, a computer-implemented method of determining a real estate property is mortgage ready may be provided. The method may include (1) receiving, at one or more processors, a request for an appraisal associated with one or more of a real estate property identification number (PIN) and/or a multiple listing service (MLS) number; (2) identifying, via the one or more processors, a computer file or memory location associated with the real estate property, the real estate property's computer file or memory location may be identified using the PIN and/or MLS number; (3) accessing, at a memory coupled to the one or more processors, the computer file or memory location corresponding to the PIN and/or MLS number to retrieve information about the real estate property, the information including one or more of list price, real estate property age, historical appraisal data, age of roof, age of siding, age of driveway, age of one or more appliances, basement remodel data, square footage data, number of bathrooms, number of bedrooms, flood or water damage data, neighborhood crime score, proximity to public transportation, proximity to airport, proximity to major metropolitan area, proximity to recreation, school district data, fire or flood claims in neighborhood, building materials data for new construction, repairs data; (4) verifying, via the one or more processors, no increased risk event occurred, the increased risk event including one or more of an indication a claim for damages was filed or the property is in one or more of a hurricane zone, a flood zone, or an earthquake zone; (5) calculating, via the one or more processors, an appraisal value for the real estate property based upon the retrieved information about the real estate property from the computer file or memory location; (6) comparing, via the one or more processors, the calculated appraisal value with the list price accessed from the computer file or memory location corresponding to the PIN and/or MLS number; and/or (7) indicating, via the one or more processors, the real estate property is mortgage ready when the calculated appraisal value is equal to or exceeds the list price value. The method may include additional, less, or alternate actions, including those discussed elsewhere herein.

In another aspect, a computer-implemented method of approving a dynamic mortgage application may be provided. The method may include (1) determining, via one or more processors, a customer is approved for a mortgage, including calculating, via the one or more processors, an amount in which the customer is approved for a mortgage loan based upon the information about the customer retrieved from a computer file or memory location/address; (2) determining, via one or more processors, a real estate property is mortgage ready, including calculating, via the one or more processors, an appraisal value for the real estate property based upon the information about the real property retrieved from the computer file or memory location/address (such as by using a machine learning or artificial intelligence algorithm); (3) comparing, via the one or more processors, the calculated amount the customer is approved for a mortgage loan with the calculated appraisal value of the real estate property; and/or (4) approving the mortgage application of the customer for the real estate property when the calculated amount the customer is approved for the mortgage loan meets, or exceeds, the calculated appraisal value of the real estate property, reducing a processing time and closing time of the mortgage. The method may include additional, less, or alternate actions, including those discussed elsewhere herein.

In another aspect, a computer-implemented method of continuously updating information about a customer approved for a mortgage may be provided. The customer may be associated with a customer identification number and the method may include: (1) monitoring, via one or more processors, information accessed from a computer file and/or memory location/address corresponding to the customer identification number, the information used to determine the customer is approved for a mortgage and including one or more of customer age, marital status, homeowner status, income level, occupation, finances or income, insurance status, education level, employment status, telematics data, credit score data, deposit account data for down payment, and current payment stub data; (2) receiving, at the one or more processors, new information about the customer, the new information used to determine the customer is approved for a mortgage and including one or more of customer age, marital status, homeowner status, income level, occupation, finances or income, insurance status, education level, employment status, telematics data, credit score data, deposit account data for down payment, and current payment stub data; (3) updating, at a memory coupled to the one or more processors, the computer file and/or memory location/address to include the new information; and/or (4) recalculating, via the one or more processors, the amount in which the customer is approved for a mortgage based upon the new information received. The method may include additional, less, or alternate actions, including those discussed elsewhere herein.

In another aspect, a computer-implemented method of identifying multiple mortgage ready properties using computer technology and/or machine learning algorithms or artificial intelligence may be provided. Each mortgage ready property may be associated with a property identification number (PIN) and/or a multiple listing service (MLS) number. The method may include (1) receiving, at one or more processors, information from a customer approved for a mortgage about preferences for a real estate property, the information including customer preference for one or more of real estate property list price, age, historical appraisal data, age of roof, age of siding, age of driveway, age of appliances, basement remodel data, square footage data, number of bathrooms, number of bedrooms, flood or water damage, neighborhood crime score, proximity to public transportation, proximity to airport, proximity to major metropolitan area, proximity to recreation, school district data, fire or flood claims in neighborhood, building materials for new construction, repairs data, and price range; (2) accessing, at a memory coupled to the one or more processors, a computer file and/or memory location/address to retrieve a plurality of mortgage ready real estate properties meeting one or more of the customer preferences information; and/or (3) transmitting, via the one or more processors, the plurality of real estate properties meeting one or more of the customer preferences information to the customer. The method may include additional, less, or alternate actions, including those discussed elsewhere herein.

In another aspect, a computer-implemented method of incentivizing an insurance agent to update a computer file and/or memory location/address may be provided. The method may include (1) receiving, at one or more processors, a message indicating an agent updated a computer file and/or memory location/address with information about a customer or a real estate property; (2) increasing, via the one or more processors and according to an interval of time, a score of the agent for at least one item of information about one or more of the customer or the real estate property updated to the computer file and/or memory location/address, the interval of time including one or more of real time, daily, weekly, bi-weekly, monthly, or quarterly; and/or (3) calculating, via the one or more processors, an agent rating based upon the score of the agent, the agent rating used to compute one or more of compensation or bonus of the agent. The method may include additional, less, or alternate actions, including those discussed elsewhere herein.

Exemplary Computing Device of System and Method of Approving a Dynamic Mortgage

Figure 13:
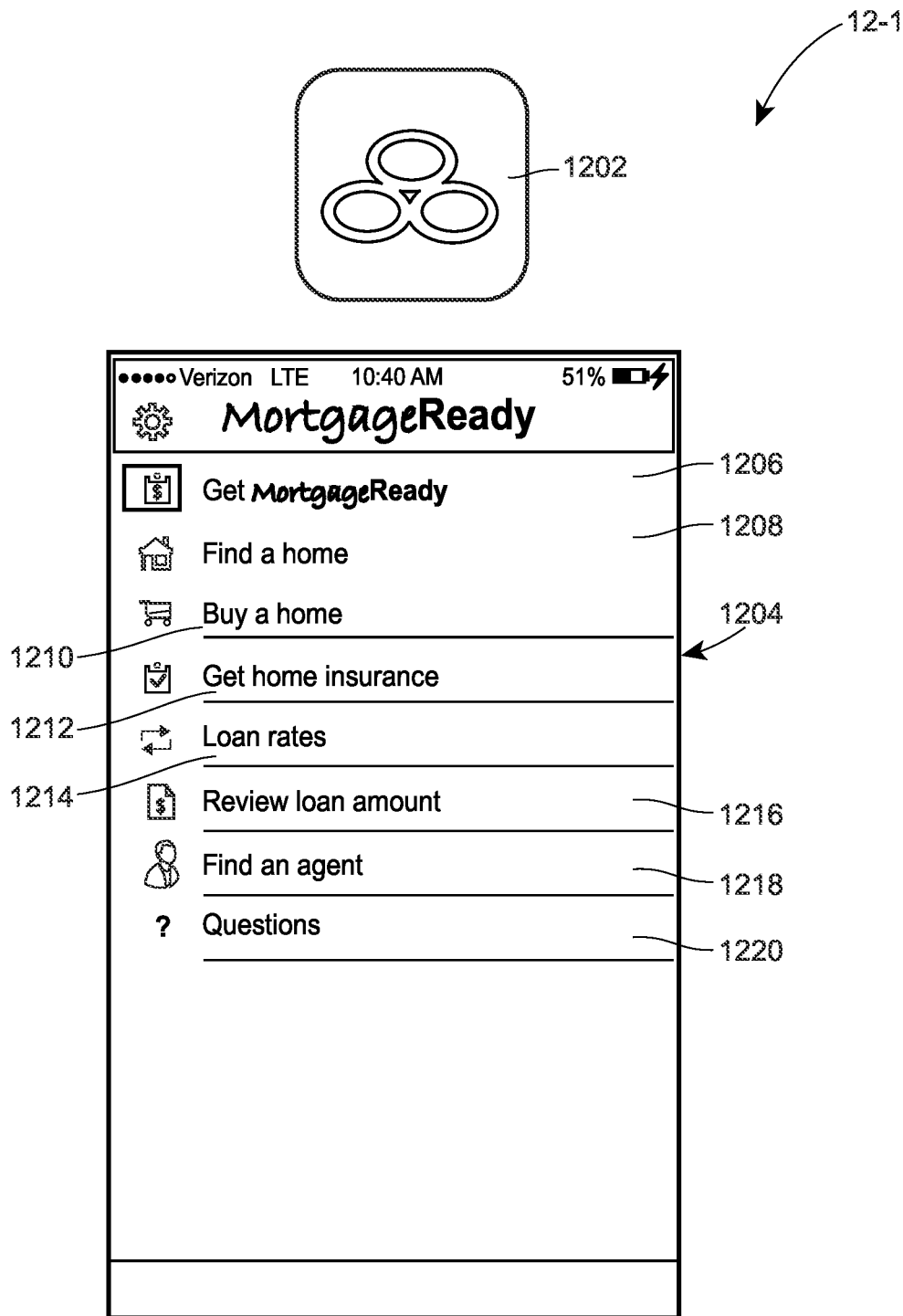
FIG. 13 is a front view of an exemplary computing device of the system and method of approving a dynamic mortgage application of FIGS. 1A and 1B.

Referring now to FIG. 13, a front view of an exemplary computing device 12-1 of the system and method of approving a dynamic mortgage application of FIGS. 1A and 1B is depicted. While the computing device 12-1 is depicted, one of ordinary skill in the art will appreciate that any other computing device of FIGS. 1A and 1B, for example, disclosed in the foregoing description may alternatively be used and still fall within the scope of the present disclosure. In this example, the exemplary computing device 12-1 is a smart phone, but may alternatively include a tablet, a personal computer, a laptop, an iPad, a Kindle or any other type of e-reader, or other electronic device. An application having the icon 1202 associated with a mortgage ready application capable of being downloaded to the exemplary computing device 12-1 is depicted.

Upon initiating the application having the icon 1202, a display 1204 of the exemplary computing device 12-1 may initially list a plurality of selections for a user or a customer. The plurality of selections include a Get MortgageReady button or touch screen area 1206, a Find A Home button or touch screen area 1208, a Buy A Home button or touch screen area 1210, a Get Home Insurance button or touch screen area 1212, a Loan Rates button or touch screen area 1214, a Review Loan Amount button or touch screen area 1216, a Find An Agent button or touch screen area 1228, and Questions button or touch screen area 1220.

Figure 14:
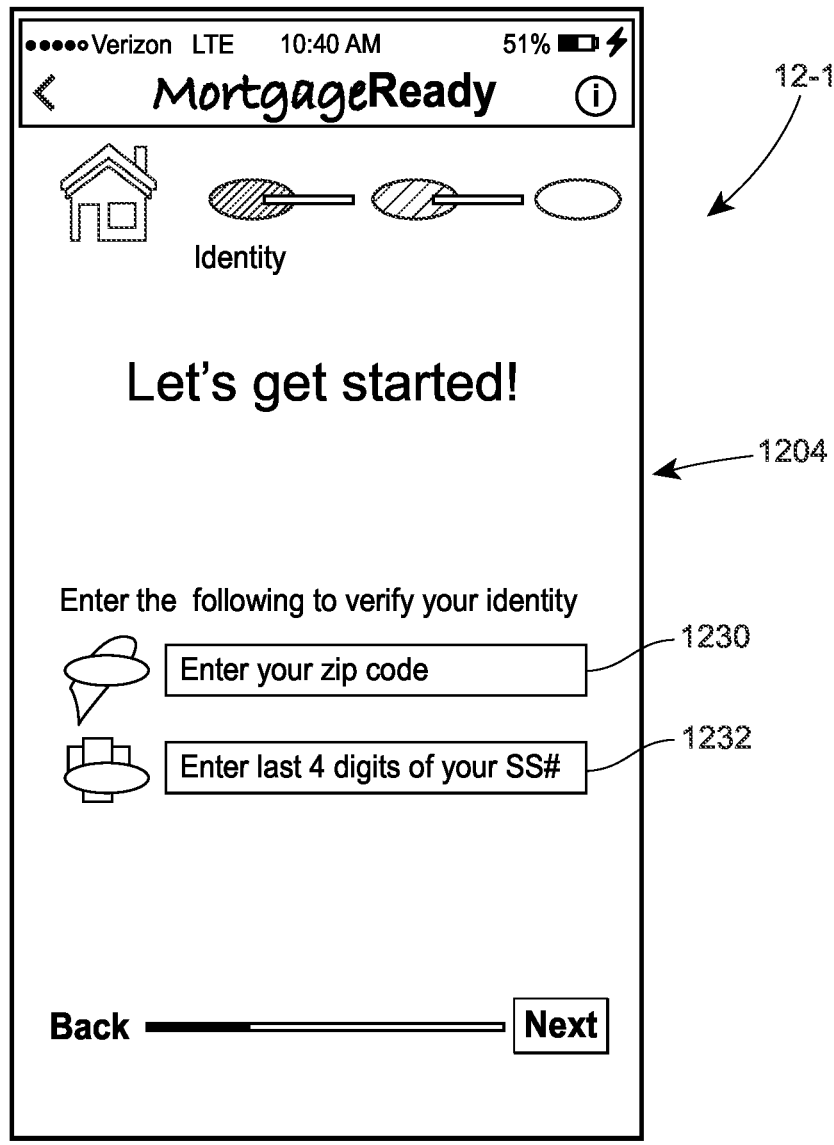
FIG. 14 is another front view of the exemplary computing device of the system and method of approving a dynamic mortgage application of FIGS. 1A and 1B, the exemplary computing device displaying a prompt for information relative to verifying an identity of the customer.

Upon selection of the Get MortgageReady button or touch screen area 1206 by a customer, for example, a verification of identity prompt for the customer is displayed, as depicted in FIG. 14. Said another way, FIG. 14 depicts the exemplary computing device 12-1 displaying prompts for information relative to verifying an identity of the customer. In one example, the prompts displayed on the computing device 12-1 upon selection of the Get MortgageReady button or touch screen area 1206 includes a Request to Enter a Zip Code prompt 1230 and a Request to Enter Last Four Digits of SS # prompt 1232.

Figure 15:
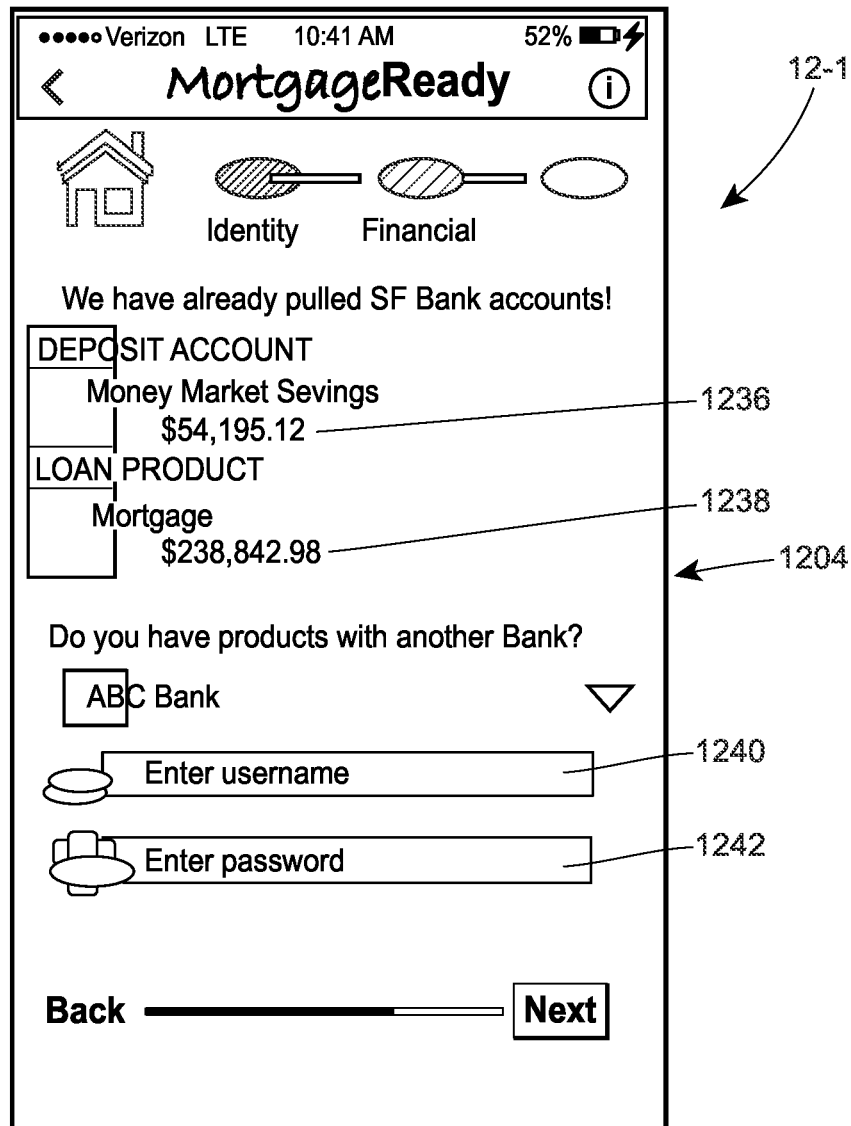
FIG. 15 is another front view of the exemplary computing device of the system and method of approving a dynamic mortgage application of FIGS. 1A and 1B, the exemplary computing device displaying bank account information relative to an identified customer.

Upon entering such data into each of the corresponding prompts 1230, 1232, the exemplary computing device 12-1 displays bank account information corresponding to the identified customer, as depicted in FIG. 15. More specifically, and in one example, after the data corresponding to prompts 1230 and 1232 is entered by the customer, the exemplary computing device 12-1 transmits the data, via one or more transmitters associated with the computing device 12-1, to the computing device 14 (FIGS. 1A and 1B) associated with the insurance entity, for example, in real time. The computing device 14 associated with the insurance entity then accesses one or more of the blockchain system 200, for example, or a memory storage location (e.g., FIG. 1B) corresponding to a customer identification number of the identified customer to retrieve information about the customer, such as financial information. In one example, the financial information includes bank account information from the insurance entity bank. The financial information retrieved about the customer, such as bank account information and loan products, is then transmitted to and listed on the display 1204 of the computing device 12-1, as depicted in FIG. 15.

In one example, deposit account information about the customer is provided in an area 1236 of the display 1204, and loan product information, such as current mortgage information, is provided in another area 1238 of the display 1204, as also depicted in FIG. 15. Of course, more or fewer bank accounts and/or loan products may alternatively and/or additionally be displayed depending upon the customer information and still fall within the scope of the present disclosure.

In addition to the customer's financial information, one or more prompts may also be displayed on the display 1204. In one example, the prompts may relate to requests for any additional accounts or products with other banks different from the computing system 14 of the insurance entity, for example. As depicted in FIG. 15, there may be another user name prompt 1240 and a password prompt 1242 associated with the username corresponding to a bank account or product with a third party different than the insurance entity. Additional data relative to such other bank accounts and/or products may then be accessed from one or more of the blockchain 200 or memory storage location corresponding to the customer and used to calculate an amount the customer is approved for a mortgage, as explained more below.

Figure 16:
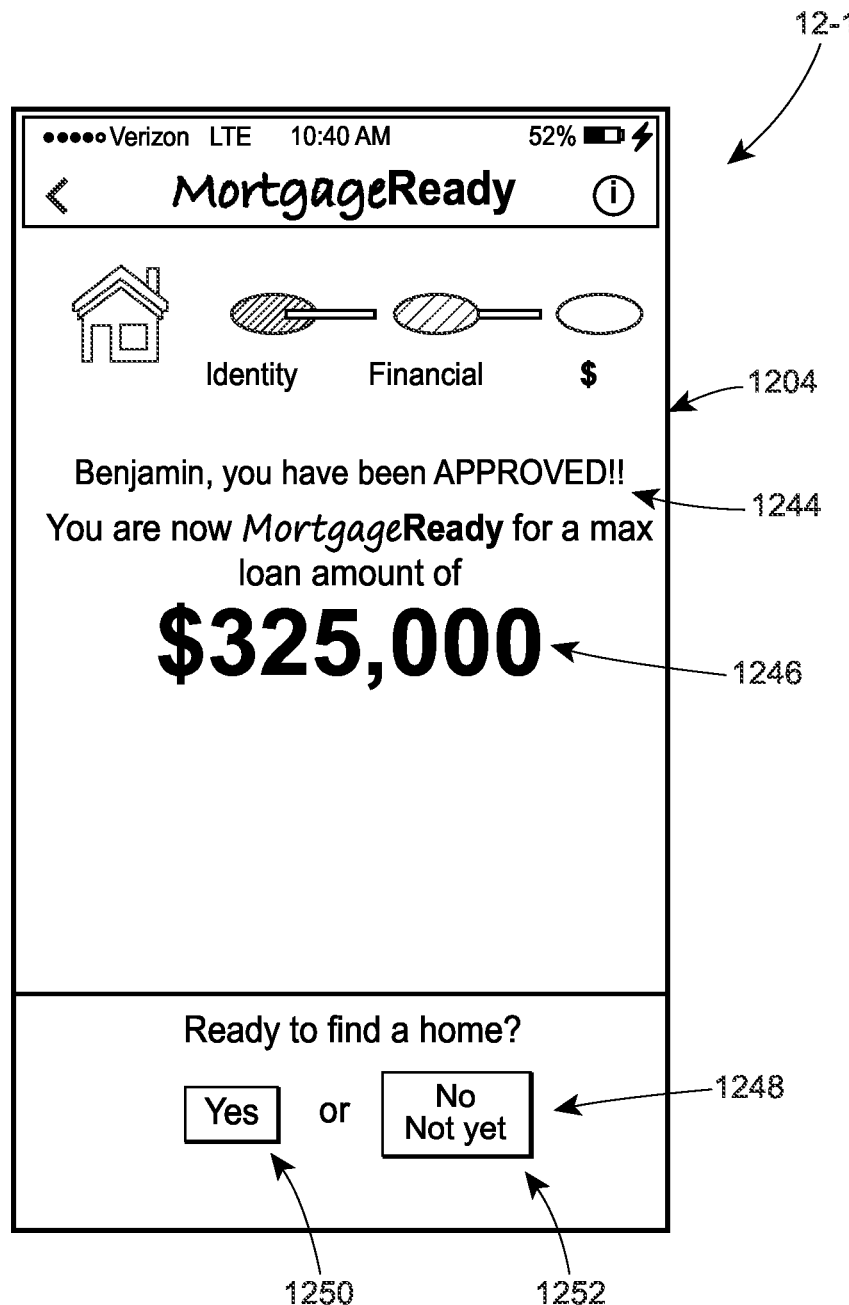
FIG. 16 is another front view of the exemplary computing device of the system and method of approving a dynamic mortgage application of FIGS. 1A and 1B, the exemplary computing device displaying a calculated amount the identified customer is approved for a mortgage.

Referring now to FIG. 16, after all of the customer information relative to the mortgage application has been accessed from one or more of a blockchain or memory storage location associated with the customer, an amount the customer is approved for the mortgage may then be calculated. In one example, information is accessed and retrieved from a memory storage location or a blockchain system of a third party, such as FinLocker or another entity having credit score information relative to the customer or information about the customer relative to underwriting a loan. As is understood from this description, and explained in detail above, calculating the amount the customer is approved for the mortgage is based upon the information retrieved about the customer relative to mortgage approval. The calculated amount the customer is approved for a mortgage is then transmitted to the computing unit 12-1 and displayed on the display 1204. In this example, both a personalized message 1244 indicating the customer is "mortgage ready" and/or approved for a mortgage and the calculated amount the customer is approved for the mortgage are displayed on the display 1204.

In another example, an additional prompt 1248 relative to finding a home is provided on the display 1204. If the customer is interested in reviewing homes for sale at that time, the customer may actuate the yes button 1250 to review a list of mortgage ready homes having an appraisal value equal to, less than, or within a range of the amount the customer is approved for the mortgage. Alternatively, if the customer is not interested in finding homes for sale at that time, the customer may actuate the No button 1252 to end the mortgage ready application on the computing system 12-1 of the customer.

Figure 17:
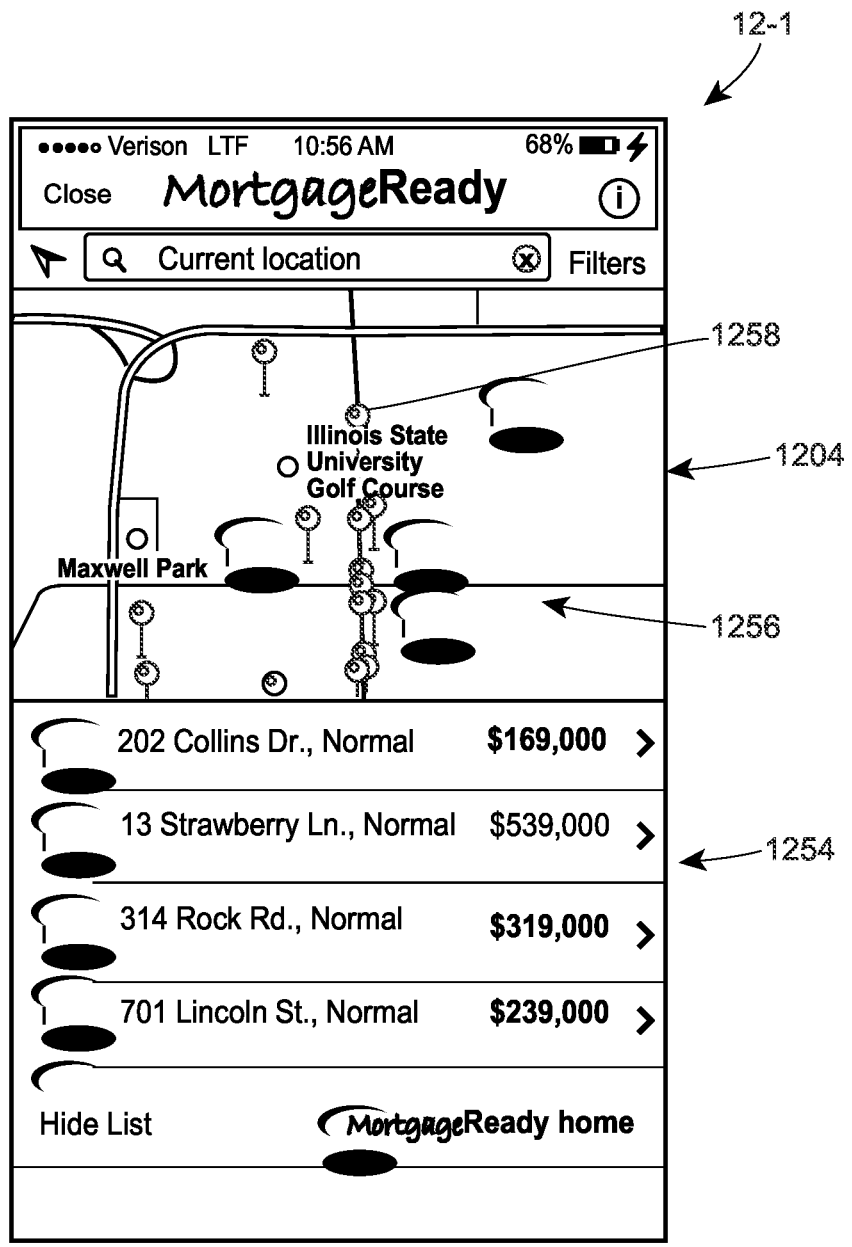
FIG. 17 is another front view of the exemplary computing device of the system and method of approving a dynamic mortgage application of FIGS. 1A and 1B, the exemplary computing device displaying a listing of mortgage ready real estate properties.

Referring now to FIG. 17, when the customer actuates the yes button 1250 (FIG. 15), a listing of real estate properties 1254 determined to be mortgage ready and having a calculated appraisal value meeting, less than, or within a range of the amount the customer is approved for a mortgage is displayed. In this listing of real estate properties 1254, the address of each real estate property and corresponding appraisal value may be displayed, as depicted in FIG. 17. In another example, a map 1256 depicting the location of each of the real estate properties provided in the listing of real estate properties 1254 may also be displayed, depicting the location of each real estate property relative to the other real estate properties in the listing 1254.

In addition, in one example, pins 1258 associated with a real estate property displayed on a map 1256 of the display 1204 may be color coded to help indicate a status. More specifically, pins 1258 having the color red may indicate the real estate property has mortgage ready status, and pins 1258 having the color blue may indicate the real estate property does not have mortgage ready status. Further, in another example, real estate properties that are for sale and have a listing value that is greater than the calculated amount the customer is approved for the mortgage may be displayed in the listing of real estate properties 1254 in a different color, such as the color gray. Likewise, real estate properties in the listing 1254 having a listing value that meets or is less than the calculated amount the customer is approved for the mortgage may be displayed in the color green.

Of course, one of ordinary skill in the art will understand that various other colors, shapes or icons may alternatively be used to code such features of the real estate properties, for example, and still fall within the scope of the present disclosure. Moreover, the listing of real estate properties 1254 may be accessed from a third party entity 23 (e.g., FIG. 1B), which may be one or more of an MLS service, Zillow, or other real estate property service having such information.

One of ordinary skill in the art will further appreciate the following benefits of the systems and methods described herein. For example, with the mortgage ready application and methods, part of which is depicted in FIG. 13, customers are continuously in an approved status, up to a supported loan amount. In addition, the systems and processes of the mortgage ready application allow the customer's information to be regularly refreshed and/or updated, which is then used to constantly update the calculated amount the customer is approved for a mortgage. In addition, when a customer has found a specific real estate property, MortgageReady application is able to seamlessly populate a 1003 application to formally complete the loan process. As a result, the customers will experience the fastest, simplest approval process in the industry, all with confidence that they are already approved.

Further, the real estate properties currently and formerly insured by the insurance entity also benefit as they are ready to be purchased upon receiving mortgage ready status, as described herein. Leveraging and accessing existing insurance entity property data, public data and title information from one or more of any of the blockchain systems or memory storage locations described above, such real estate properties are qualified for an accelerated purchase. Further, the insurance entity will capitalize on the existing data to drastically reduce the costs and time associated with appraisals and title transfers. When a customer of a bank affiliated with the insurance entity is purchasing a MortgageReady real estate property insured by the insurance entity, for example, they will experience a faster, easier collateral verification and title transfer process.

In one aspect, a computer-implemented method of matching a mortgage ready customer with a mortgage ready property may be provided. The method may include, via one or more processors, servers, networks, and/or transceivers: (1) retrieving from a memory unit, or receiving (such as via wireless communication or data transmission over one or more radio frequency links) customer income and/or asset information; (2) verifying an identity of a customer that is currently online, such as via a secure network connection; (3) verifying that the customer's income and/or asset information is up-to-date or current, or receiving up-to-date income and/or asset information for the customer via a secure network connection; (4) pre-approving the customer up to a maximum loan amount based upon the current or up-to-date customer income and/or asset information; (5) asking or inquiring of the customer if they are ready to search available (and/or mortgage ready) properties, or otherwise receiving an indication from the customer's mobile device that the customer is actively shopping properties or wants to see available properties; and/or (6) if so, causing a virtual map of available properties for sale to be graphically depicted on the customer's mobile device, the properties graphically depicted being color coded to indicate whether (i) they have list prices below the maximum loan amount that the customer is currently pre-approved for, and/or (ii) are mortgage ready (e.g., pre-vetted to indicate that an appraisal indicates that the house is valued at or near the asking price). The map depicted may be centered about or around a current GPS location retrieved or received from the customer's mobile device. The method may include additional, less, or alternate actions, including those discussed elsewhere herein.

In another aspect, a computer system configured to match a mortgage ready customer with a mortgage ready property may be provided. The system may include one or more processors, servers, networks, and/or transceivers configured to: (1) retrieve from a memory unit, or receive (such as via wireless communication or data transmission over one or more radio frequency links) customer income and/or asset information; (2) verify an identity of a customer that is currently online, such as via a secure network connection; (3) verify that the customer's income and/or asset information is up-to-date or current, or receive up-to-date income and/or asset information for the customer via a secure network connection; (4) pre-approve the customer up to a maximum loan amount based upon the current or up-to-date customer income and/or asset information; (5) ask or inquire of the customer if they are ready to search available (and/or mortgage ready) properties, or otherwise receive an indication from the customer's mobile device that the customer is actively shopping properties or wants to view available properties; and/or (6) if so, cause a virtual map of available properties for sale to be graphically depicted on the customer's mobile device, the properties graphically depicted being color coded to indicate whether (i) they have list prices below the maximum loan amount that the customer is currently pre-approved for, and/or (ii) are mortgage ready (e.g., pre-vetted to indicate that an appraisal indicates that the house is valued at or near the asking price). The map depicted may be centered about or around a current GPS location retrieved or received from the customer's mobile device. The system may include additional, less, or alternate functionality, including that discussed elsewhere herein.

In another aspect, a graphical user interface (GUI) for graphically representing or virtually depicting mortgage ready properties may be provided. The GUI may include (1) a map portion showing or depicting properties for sale, such as via icons, the properties or representative icons being color coded. The GUI may utilize color coding, i.e., a first and second color, within the map portion, such as the first color being associated with properties that are (i) mortgage ready, and/or (ii) within a purchase price amount that the customer is approved for; and the second color being associated with properties that are (i) not mortgage ready (i.e., not pre-vetted/inspected/appraised), and/or (ii) have list prices above an approved max purchase price for the customer. The GUI may also include (2) a list price portion listing (a) addresses, and (b) list prices for the properties shown in the map portion. As a result, matching mortgage ready customers with mortgage ready properties is facilitated and the customer experience enhanced.

ADDITIONAL CONSIDERATIONS

The following additional considerations apply to the foregoing discussion. Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Discussions herein referring to an "appraiser," "inspector," "adjuster," "claim representative" or the like are non-limiting. One skilled in the art will appreciate that any user associated with an insurance company or an insurance function may utilize one or more of the devices, systems, and methods disclosed in the foregoing description. One skilled in the art will further realize that any reference to a specific job title or role does not limit the disclosed devices, systems, or methods, or the type of user of said devices, systems, or methods.

Certain implementations are described herein as including logic or a number of components, modules, or mechanisms. Modules may constitute either software modules (e.g., code implemented on a tangible, non-transitory machine-readable medium such as RAM, ROM, flash memory of a computer, hard disk drive, optical disk drive, tape drive, etc.) or hardware modules (e.g., an integrated circuit, an application-specific integrated circuit (ASIC), a field programmable logic array (FPLA)/field-programmable gate array (FPGA), etc.). A hardware module is a tangible unit capable of performing certain operations and may be configured or arranged in a certain manner. In exemplary implementations, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one implementation," "one embodiment," "an implementation," or "an embodiment" means that a particular element, feature, structure, or characteristic described in connection with the implementation is included in at least one implementation. The appearances of the phrase "in one implementation" or "in one embodiment" in various places in the specification are not necessarily all referring to the same implementation.

Some implementations may be described using the expression "coupled" along with its derivatives. For example, some implementations may be described using the term "coupled" to indicate that two or more elements are in direct physical or electrical contact. The term "coupled," however, may also mean that two or more elements are not in direct contact with each other, but yet still co-operate or interact with each other. The implementations are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the implementations herein. This is done merely for convenience and to give a general sense of the invention. This description should be read to include one or at least one and the singular also includes the plural unless it is obvious that it is meant otherwise.

Moreover, the patent claims at the end of this patent application are not intended to be construed under 35 U.S.C. § 112(f) unless traditional means-plus-function language is expressly recited, such as "means for" or "step for" language being explicitly recited in the claim(s). The systems and methods described herein are directed to an improvement to computer functionality, and improve the functioning of conventional computers.

Upon reading this disclosure, those of skill in the art will appreciate still additional alternative structural and functional designs for a system and a process for inspecting a structure to estimate the condition of a structure through the disclosed principles herein. Thus, while particular implementations and applications have been illustrated and described, it is to be understood that the disclosed implementations are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

We claim:

1. A computer-implemented method comprising:
receiving, by one or more processors, first information corresponding to a customer, the first information being used to determine a mortgage approval amount associated with the customer;
calculating, by the one or more processors, the mortgage approval amount based at least in part on the first information;
compiling, by the one or more processors, a first block for storage on a blockchain in a memory, the first block including the first information and the mortgage approval amount, wherein compiling the first block includes computing a first hash value using a cryptographic hash function and assigning the first hash value to the first block;
receiving, by the one or more processors, second information corresponding to the customer, the second information including updates of the first information;
calculating, by the one or more processors, an updated mortgage approval amount associated with the customer based at least in part upon the second information;
compiling, by the one or more processors, a second block for storage on the blockchain in the memory, the second block including the second information and the updated mortgage approval amount, wherein compiling the second block includes computing a second hash value using the cryptographic hash function and the first hash value, and assigning the second hash value to the second block; and
verifying, by the one or more processors, that the second information meets qualifications for maintaining mortgage-ready status of the customer, wherein the qualifications include at least one of a down payment amount or proof of employment status.

2. The computer-implemented method of claim 1, wherein the second information corresponding to the customer is updated in a pre-set time interval or in real-time.

3. The computer-implemented method of claim 1, wherein the first information further includes one or more of customer age, marital status, homeowner status, income data, occupation, insurance status, education level, employment status, telematics data, credit score data, down payment account data, or pay stub data.

4. The computer-implemented method of claim 1, further comprising:
compiling, by the one or more processors, a third block for storage on the blockchain in the memory, the third block including the mortgage-ready status of the customer,
wherein compiling the third block includes computing a third hash value using the cryptographic hash function and the first hash value, and assigning the third hash value to the third block.

5. The computer-implemented method of claim 1, further comprising:
receiving, by the one or more processors, a request for a mortgage associated with the customer, the request including a customer identification number and a mortgage loan amount;
identifying, by the one or more processors and using the customer identification number, the second block on the blockchain;
retrieving, by the one or more processors, the updated mortgage approval amount from the second block;
determining, by the one or more processors, that the updated mortgage approval amount is greater than or equal to the mortgage loan amount; and
based on determining that the updated mortgage approval amount is greater than or equal to the mortgage loan amount, determining, by the one or more processors, that the customer is mortgage ready.

6. The computer-implemented method of claim 1, wherein the first block and the second block are cryptographically linked in the blockchain based at least in part on the first hash value and the second hash value.

7. A system comprising:
one or more processors; and
a memory configured to store non-transitory computer executable instructions, that when executed by the one or more processors, cause the system to:
receive first information corresponding to a customer, the first information being used to determine a mortgage approval amount associated with the customer;
calculate the mortgage approval amount based at least in part on the first information;
compile a first block for storage on a blockchain in the memory, the first block including the first information and the mortgage approval amount, wherein compiling the first block includes computing a first hash value using a cryptographic hash function and assigning the first hash value to the first block;
receive second information corresponding to the customer, the second information including updates of the first information;
calculate an updated mortgage approval amount associated with the customer based at least in part upon the second information;
update the first block to include the updated mortgage approval amount, wherein updating the first block includes recompiling the first block including computing a second hash value using the cryptographic hash function and updating the first hash value with the second hash value; and
verify that the second information meets qualifications for maintaining mortgage-ready status of the customer, wherein the qualifications include at least one of a down payment amount or proof of employment status.

8. The system of claim 7, wherein the second information corresponding to the customer is updated in a pre-set time interval or in real-time.

9. The system of claim 7, wherein the non-transitory computer executable instructions, that when executed by the one or more processors, further cause the system to:
compile a third block for storage on the blockchain, the third block including the mortgage-ready status of the customer,
wherein compiling the third block includes computing a third hash value using the cryptographic hash function and the first hash value, and assigning the third hash value to the third block.

10. A non-transitory computer-readable memory storing thereon instructions that, when executed by one or more processors, cause the one or more processors to:
- receive first information corresponding to a customer, the first information being used to determine a mortgage approval amount;
- calculate the mortgage approval amount based at least in part on the first information;
- compile a first block for storage on a blockchain in the non-transitory computer-readable memory, the first block including the first information and the mortgage approval amount, wherein compiling the first block includes computing a first hash value using a cryptographic hash function and assigning the first hash value to the first block;
- receive second information corresponding to the customer, the second information including updates of the first information;
- calculate an updated mortgage approval amount based at least in part upon the second information;
- update the first block to include the updated mortgage approval amount, wherein updating the first block includes recompiling the first block including computing a second hash value using the cryptographic hash function and updating the first hash value with the second hash value; and
- verify that the second information meets qualifications for maintaining mortgage-ready status of the customer, wherein the qualifications include at least one of a down payment amount or proof of employment status.

11. The non-transitory computer-readable memory of claim 10, wherein the second information corresponding to the customer is updated in a pre-set time interval or in real-time.

12. The non-transitory computer-readable memory of claim 10, wherein the non-transitory computer executable instructions, that when executed by the one or more processors, further cause the one or more processors to:
- compile a third block for storage on the blockchain, the third block including the mortgage-ready status of the customer,
- wherein compiling the third block includes computing a third hash value using the cryptographic hash function and the first hash value and assigning the third hash value to the third block.

13. The non-transitory computer-readable memory of claim 10, wherein the first information includes one or more of customer age, marital status, homeowner status, income data, occupation, insurance status, education level, employment status, telematics data, credit score data, down payment account data, or pay stub data.

14. The non-transitory computer-readable memory of claim 10, wherein the first information corresponding to the customer is updated in a pre-set time interval or in real-time.

* * * * *